US007716093B2

(12) United States Patent
Johnson et al.

(10) Patent No.: US 7,716,093 B2
(45) Date of Patent: May 11, 2010

(54) SALES TAX ASSESSMENT, REMITTANCE AND COLLECTION SYSTEM

(75) Inventors: Kevin C. Johnson, Villanova, PA (US); Brendan P. Johnson, Skillman, NJ (US); John O. Ridley, Harrisburg, PA (US); Josaphat A. Plater-Zyberk, Chester Springs, PA (US)

(73) Assignee: Tax Matrix Technologies, LLC, Wormleysburg, PA (US)

( * ) Notice: Subject to any disclaimer, the term of this patent is extended or adjusted under 35 U.S.C. 154(b) by 2176 days.

(21) Appl. No.: 09/881,533

(22) Filed: Jun. 14, 2001

(65) Prior Publication Data
US 2002/0052792 A1 May 2, 2002

Related U.S. Application Data

(60) Provisional application No. 60/211,625, filed on Jun. 14, 2000, provisional application No. 60/215,284, filed on Jun. 30, 2000, provisional application No. 60/215,285, filed on Jun. 30, 2000, provisional application No. 60/216,754, filed on Jul. 7, 2000, provisional application No. 60/216,755, filed on Jul. 7, 2000, provisional application No. 60/218,196, filed on Jul. 14, 2000.

(51) Int. Cl.
*G06F 17/22* (2006.01)
(52) U.S. Cl. ........................................................ 705/31
(58) Field of Classification Search .................. 705/31, 705/19
See application file for complete search history.

(56) References Cited

U.S. PATENT DOCUMENTS 5,335,169 A    8/1994  Chong 5,592,611 A * 1/1997 Midgely et al. ................. 714/4

(Continued)

FOREIGN PATENT DOCUMENTS

GB     2 326 242 A  * 11/2001

(Continued)

OTHER PUBLICATIONS

White, Ron, How Computers Work, Millennium Ed. Que Corporation, Sep. 1999.*

(Continued)

*Primary Examiner*—James Kramer
*Assistant Examiner*—Lindsay M. Maguire
(74) *Attorney, Agent, or Firm*—John F. Letchford; Archer & Greiner, P.C.

(57) ABSTRACT

An adaptive computerized system of assessing the taxability of goods or services sold at retail or wholesale. The system has the capability to conduct an analysis of all products and/or services sold by a retailer or wholesaler either offline or online and provide the seller with the ability to monitor the tax status, including tax rates, of any goods or services sold by the seller at the point of sale or online in any number of taxing jurisdictions. The system includes a master database which links uniform commodities code technology such as UPC to tax assessment information for goods and/or services sales transactions made by any number of merchants in potentially unlimited taxing jurisdictions. The system also automatically generates tax collection and remittance reports and submit such report and the tax payment to the appropriate taxing jurisdictions.

53 Claims, 11 Drawing Sheets

U.S. PATENT DOCUMENTS

| | | | |
|---|---|---|---|
| 5,644,724 A | 7/1997 | Cretzler | |
| 5,774,872 A | 6/1998 | Golden et al. | |
| 5,799,283 A | 8/1998 | Francisco et al. | |
| 5,819,249 A | 10/1998 | Dohanich et al. | |
| 5,825,884 A * | 10/1998 | Zdepski et al. | 705/78 |
| 5,875,433 A | 2/1999 | Francisco et al. | |
| 5,924,077 A | 7/1999 | Beach et al. | |
| 5,987,429 A * | 11/1999 | Maritzen et al. | 705/31 |
| H1830 H * | 1/2000 | Petrimoulx et al. | 111/31 |
| 6,016,479 A * | 1/2000 | Taricani, Jr. | 705/19 |
| 6,078,898 A * | 6/2000 | Davis et al. | 705/19 |
| 6,078,899 A * | 6/2000 | Francisco et al. | 705/19 |
| 6,141,650 A * | 10/2000 | Iwasa et al. | 705/19 |
| 6,202,052 B1 * | 3/2001 | Miller | 705/31 |
| 6,219,692 B1 * | 4/2001 | Stiles | 709/201 |
| 6,223,168 B1 * | 4/2001 | McGurl et al. | 705/40 |
| 6,223,209 B1 * | 4/2001 | Watson | 709/201 |
| 6,282,517 B1 * | 8/2001 | Wolfe et al. | 705/26 |
| 6,298,373 B1 * | 10/2001 | Burns et al. | 709/203 |
| 6,347,304 B1 * | 2/2002 | Taricani, Jr. | 705/19 |
| 6,370,580 B2 * | 4/2002 | Kriegsman | 709/226 |
| 6,625,579 B1 * | 9/2003 | Komai | 705/20 |
| 2002/0116302 A1 * | 8/2002 | Wilmes et al. | 705/31 |
| 2003/0055754 A1 * | 3/2003 | Sullivan | 705/31 |
| 2003/0093320 A1 * | 5/2003 | Sullivan | 705/19 |
| 2003/0233297 A1 * | 12/2003 | Campbell | 705/31 |

FOREIGN PATENT DOCUMENTS

WO     WO 00/30001    *   5/2000

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

* cited by examiner

|  | Price | Ship Method | Gift |
|---|---|---|---|
| #25020 Blk O/S Computer | $285.00 | | ☐ |
| #25020 BLK O/S Dooney Gloves | $205.00 | | ☐ |

| | Merchandise Subtotal | $570.00 |
|---|---|---|
| | Giftboxing Total | $0.00 |
| | Ship Charge | $14.95 |
| Are you claiming an exemption | Sales Tax | $35.10 |
| Yes   No | | $620.05 |
| ☐     ☐ | | |
| If yes, what is your Federal ID# ———— (Required) | | |

FIG. 5

Click on the tax status of each item

| Click here if all good(s) and/or service(s) are exempt under the same exempt code. Please choose the exemption here: ☑ → |||||
|---|---|---|---|
| Item | Taxable | Non Taxable | Exemption Claimed |
| Computer | ☐ | ☑ | Drop Down Menu |
| Dooney Gloves | ☑ | ☐ | Drop Down Menu |

62 —
PA
01 Sale for Resale
02 Manufacturing
03 R&D
04 Charity
05 Political

PA
01 Sale for Resale
02 Manufacturing
03 R&D
04 Charity
05 Political

SALES TAX ASSESSMENT, REMITTANCE AND COLLECTION SYSTEM

CROSS-REFERENCE TO RELATED APPLICATIONS

This application claims the benefit of U.S. Provisional Application No. 60/211,625, filed Jun. 14, 2000; U.S. Provisional Application No. 60/215,284, filed Jun. 30, 2000; U.S. Provisional Application No. 60/215,285, filed Jun. 30, 2000; U.S. Provisional Application No. 60/216,754, filed Jul. 7, 2000; U.S. Provisional Application No. 60/216,755, filed Jul. 7, 2000; and U.S. Provisional Application No. 60/218,196, filed Jul. 14, 2000.

FIELD OF THE INVENTION

The present invention relates in general to systems for sales or consumption tax assessment, remittance and collection. In particular, the invention provides an adaptive point of sale sales tax assessment, remittance and collection system for conventional and electronic commerce sales transactions. The system enables real-time determination of federal, state and local sales tax rates and exemptions for all taxing jurisdictions around the world, given the physical address at which the appropriate tax rate or exemption must be identified. The present invention also provides real-time reports to state and local taxing jurisdictions and retailers, and creates a reliable back office system for assuring that the correct sales tax is remitted to the proper taxing authority.

BACKGROUND OF THE INVENTION

Sales or consumption taxes have long served as sources of revenue for governmental entities at all levels. Levied at the time of purchase, sales or consumption tax is imposed on myriad goods and services deemed taxable by federal/national, state/provincial and local governments. In the United States, for example, forty-five states presently impose state sales tax on goods and services sold in those states. Local governments within those and other states may assess similar taxes, and the federal government may impose luxury or other sales taxes or levies on certain goods or services. Other countries or regions may impose similar taxes commonly known as value added taxes or VATs.

Because of the virtual character of the Internet, online sales transactions have thus far gone essentially untaxed. Rising Internet sales activities present tax issues of increasing significance. The growth of the remote selling component of the Internet (i.e., electronic commerce or e-commerce) has been fueled by the many unique advantages the Internet offers consumers versus traditional means of commerce. These include greater purchasing convenience, a much larger variety of available goods and services, increased product and service information, and, in many instances, lower prices.

E-commerce growth projections are well documented. For example, Forrester Research, Inc. of Cambridge, Mass., has estimated that global business-to-business and business-to-consumer commerce over the Internet may reach as high as 6.8 trillion by 2004. Even a much more conservative growth scenario offered by Karl Freiden in his 2000 book entitled *Cybertaxation: The Taxation of E-Commerce* ("Freiden") has estimated that in the United States alone, sales to both businesses and consumers via the Internet are projected to increase from $50 billion in 1998 to $1.5 trillion (of an estimated global total of almost $1.8 trillion) by 2003.

E-commerce poses a considerable threat to local, regional, and state taxation revenues. The meteoric rise of e-commerce and web retailing is further reinforcing the trend toward direct marketing and remote selling that has been established by mail order shopping and television home-shopping channels, such as the Home Shopping Network and QVC. Typically, an online transaction is completed once a credit card company authorizes a customer's issuing bank to send payment to a merchant's accepting bank. For a merchant with an online presence and that sells goods or services to customers that are located in the states where the merchant maintains a physical presence, the merchant is responsible for collecting the appropriate sales tax and for full timely remittance to the appropriate taxing jurisdiction. However, many web merchants do not maintain costly "brick and mortar" retail outlets. Rather, their business model supports a remote seller concept that is almost identical to a mail-order business model. A remote seller is an entity that sells goods or services in a jurisdiction in which it does not have a physical presence or nexus. As a remote seller, these entities are not required to collect and remit sales taxes to the jurisdictions in which their products or services are delivered. In fact, a presently existing federal moratorium on taxation of Internet sales transactions and a U.S. Supreme Court decision, *Quill Corp. v. South Dakota*, 504 U.S. 298 (1992), expressly relieve a remote seller from the responsibility of collecting sales tax unless it maintains a physical presence in a state in which it conducts sales. The premise of the Quill ruling was that it is too burdensome for remote sellers to collect taxes levied in states where they do not have nexus.

Freiden has estimated that state and local taxes account for over $700 billion in revenues in the United States, or about 45% of all tax dollars raised in the country. This tax revenue stream is used to support basic public services, including state and local fire and police operations, educational facilities, and road/bridge construction and other infrastructure projects. Since the majority of web retailers sell remotely and thus do not collect sales tax, the ability of state and local taxing jurisdictions to maintain their tax revenue bases and public services offerings will increasingly suffer. Indeed, in reliance upon statements from the Center on Budget and Policy Priorities, Freiden estimates that, by 2003, tax revenue losses attributable to remote mail-order sales will be $5 billion and remote Internet sales will be $10 billion.

Although remote electronic transactions conducted over the Internet and the like are rapidly increasing in number, conventional point of sale transactions presently constitute the majority of automated wholesale and retail sales presently conducted in the United States and elsewhere. In a typical point of sale transaction, an object bearing a uniform commodities code such as a barcode on its exterior or its packaging is scanned by a code reader to register the transaction. In the process of scanning, the code reader normally retrieves transactional information associated with the goods or services being purchased such as a description of the goods or services, the cost of the goods or services, the presently known tax status of the goods or services (e.g., taxable, non-taxable, tax-exempt) in the taxing jurisdiction in which the goods or services are sold, and the presently known tax rate associated with the goods or services, if taxable, in the taxing jurisdiction in which the goods or services are sold. Records of these transactions may be stored locally or at a central location. The wholesaler or retailer periodically forwards the sales taxes collected thereon to the appropriate state and/or local taxing authorities.

For companies operating in relatively localized markets, the task of maintaining the accuracy and integrity of its coded tax information with reasonable timeliness may be quite manageable. However, for companies that sell hundreds or thousands of coded products or services and conduct business nationally or globally in many taxing jurisdictions, maintaining current and reliable tax assessment information may be daunting. Moreover, in the absence of up-to-date sales tax information, such companies may expose themselves to considerable tax liability for undertaxing or failing to tax its taxable goods and services. Conversely, if a company overtaxes its customers on taxable transactions or, alternatively, charges tax on non-taxable or tax-exempt transactions, the attendant inflated prices of its goods or services may deleteriously impact the company's ability to compete in the marketplace and, possibly, expose the company to legal liability.

Several automated systems are known that address point of sale sales tax issues such as monitoring, assessment and collection.

For example, U.S. Pat. Nos. 5,644,724, 5,774,872, 5,799,283 and 5,875,433 disclose automatic sales tax collection and remittance systems.

U.S. Pat. No. 5,924,077 describes an automated system for monitoring point of sale business information data including whether sales tax is or is not charged at the point of sale.

U.S. Pat. No. 5,335,169 provides an automated system whereby the system user may track multiple types of sales tax assessments for different taxing authorities.

And, U.S. Pat. No. 5,819,249 discloses a system which is also adaptable to compute, inter alia, sales or use tax status for transactions in multiple taxing jurisdictions. The system employs an interactive question and answer type program whereby the user of the system is prompted by the program to respond to a series of inquiries whereby the nature of the user's responses determines the tax status of a transaction in a desired jurisdiction.

The present inventors are aware of no independent third party services which employ an adaptive system including a master tax assessment database compiled from the contents of a plurality of client databases, whereby the master database serves as a repository for the tax status and tax rate information for the clients' collective inventories of goods and services and against which any individual client's sales tax database may be quickly compared, modified and saved upon request. The present inventors believe that the systems described in the aforementioned U.S. patents would appear to rely on tax status databases compiled by personnel employed or contracted by the individual systems users from sundry sources such as state and local tax authorities and professional journals to create and maintain internal tax status databases unique to each user. To be even modestly reliable, the content of the databases cannot be static and must be periodically updated. However, the speed and frequency at which such updates are performed may be less than desirable. This is because considerable time and research may be required for employee or contractor tax specialists, even if working in teams, to compile all of the latest product information and tax status and rate information that may be applicable to all of the many jurisdictions in which a company, especially a large company, may conduct business. It will be appreciated that prohibitive budgetary and time constraints would effectively prevent essentially real-time maintenance of such databases. Consequently, it is likely that, if placed into actual service, the systems disclosed in the patents frequently would perform their tax status monitoring functions in reliance upon outdated information which might expose the users of the systems to considerable economic harm and, possibly, tax or other legal liabilities.

Additionally, there are no systems presently known to the inventors for accepting online sales tax exemption certificates, for providing real-time reports to state and local taxing jurisdictions and retailers, and for providing a back office system that remits the correct sales tax to the proper taxing authority.

The United States Constitution generally respects state sovereignty with respect to a state's ability to impose taxes on goods and services sold within its borders. Accordingly, state legislatures commonly impose sales tax on certain goods and services and permit certain uses of goods and services to be exempted from sales tax. Whether a commodity is exempted from sales tax is based on the how the commodity is used by the purchaser. For example, the Commonwealth of Pennsylvania generally imposes sales tax on computers. However, computers can be bought exempt from sales tax if they are to be used in research and development, manufacturing, or by charitable institutions or political subdivisions (the latter two are exempted in all states). Political, social, and industrial lobbying groups, as well as individual companies, routinely lobby state legislatures for exemptions that create financial incentives and tax advantages for their particular concerns. Conversely, legislatures have proactively sought to create benefits for taxpayers in their jurisdictions by providing tax exemptions and exclusions and other financial incentives to targeted industries, sectors, or companies to stimulate economic activity.

Political entities, charitable institutions, and businesses procuring goods and services for exempt purposes commonly provide exemption certificates to the vendors of the goods and services which sets forth the exempt manner in which the good or service will be used. By accepting this exemption certificate, a vendor safeguards itself from tax audit liability for granting the exemption from the state or local jurisdiction in which the vendor operates.

Businesses or institutions that utilize sales tax exemption certificates must apply and register in each state in which they intend on using the certificates. Once an application is received, a state issues an exclusive sales tax exemption number for the particular taxpayer. Large nationwide businesses and each of their separate subsidiaries are typically issued multiple exemption numbers for each state in which they conduct business.

Dell Computer Corporation of Round Rock, Tex., one of the largest web retailers, utilizes a traditional method when allowing entities to purchase computers and related computer equipment under a tax exemption. As used herein, the term "web retailer" shall be construed to mean any merchant who conducts electronic sales online via the Internet or other interactive broadband network, and shall include any merchant who conducts either retail or wholesale sales. Dell's traditional exemption choice model requires that the customer conduct a Dell service representative by telephone and verbally provide exemption status information in order to process the transaction. However, the consumer must first call a Dell service representative to establish an account as well as provide an exemption number to Dell. This is the typical model followed by web retailers whose primary target market is business, political, or charitable entities for enabling their customers to purchase goods and services without paying sales tax.

The following exemplifies the inefficiencies of the traditional method for purchasing tax exempt merchandise online. First assume that a New Jersey subsidiary of General Electric Company (GE) of Fairfield, Conn. purchases computers through Dell Corporation's website. GE will use these computers for research and development for their plant operations in New Jersey. GE personnel are aware that computers used for research and development in New Jersey can be purchased exempt from sales tax by using a standard New Jersey ST-5 research and development exemption certificate. Dell requires that customers such as GE, must first call a Dell customer representative and provide their exemption information. Dell then stores this information for their own records as well as for state and local taxing authorities.

When Dell Corporation files a sales tax return in New Jersey it is required to provide the state with information regarding its sales in New Jersey as well as exemption information associated with those sales. GE's New Jersey subsidiary is also required by New Jersey law to maintain records of purchases made using exemption certificates. These records of exemption purchases safeguard both Dell and GE from audit liability.

At present, however, there is no real-time interactive means by which sales tax exemptions are processed on sellers' websites or on their customers' web browsers for goods and services sold online.

Moreover, in the United States, the imposition of sales tax is based on the location where a particular product or service is delivered to a consumer's possession. Thus, sellers of goods and services with a nexus or physical presence in the state of delivery, such as telecommunications companies, must apply the correct tax rate when billing their customers. In many situations, applying the correct rate can be a daunting task since over 10,000 state and local jurisdictions in the United States impose their own rates. This is complicated by the fact it is often difficult to determine with precision the actual local taxing jurisdiction into which a purchased commodity is to be delivered.

The present inventors have observed that the jurisdictional boundaries of most local governments can be ascertained with reasonable certainty simply by using commercially available mapping software (usually approved by the United States Postal Service, USPS) that applies the tax rate based on ZIP and ZIP+4 delivery address codes. "ZIP" is an acronym for Zone Improvement Plan.

Indeed, ZIP and ZIP+4 codes can be used to determine the proper taxing jurisdiction for a commodities sales transaction with an accuracy rate of approximately 89%. Although this level of precision may seem acceptable, the fiscal impact of its shortcomings is a concern for many smaller local governments. It is not uncommon for different local tax rates to apply within the same ZIP code. For example, a commercial address on one side of a busy street in a large city such as Denver, Colo. may be taxed at one rate, while a commercial address on the same street may be taxed at a different rate yet both reside in the same ZIP+4 area code. Under these circumstances, the appropriate local taxing authority bears the considerable administrative burden of determining whether the correct taxes are being assessed as well as collecting those taxes.

The deficiencies of existing sales tax systems are easily observed when two or more taxing jurisdictions fall into a single ZIP code and ZIP+4 code. In those situations, an affected business cannot be certain whether it is assessing the proper local sales taxes at the point of sale (or point of commodities delivery). This poses a dilemma for retailers with a physical presence in the state of delivery since they are liable for any mistakes made in applying the incorrect tax.

An advantage exists, therefore, for an adaptive system including a master database in which accurate tax assessment information from unlimited taxing jurisdictions may be stored, continuously updated and easily matched with virtually any online or conventional point of sale product or service offered for sale by any wholesaler or retailer that is a participant in or client of the system. A further advantage exists for such a system wherein the system employs presently existing or hereinafter developed technologies or systems for uniformly coding commodities as the bases for identifying, monitoring and modifying tax status information relating to product and/or services listings in the master database and client databases. As used herein, the term "commodities" shall be construed to cover both goods and services. For example, a presently available and widely used uniform commodities coding means suitable for the purposes of the present invention is barcode technology such as the Universal Product Code (UPC). A particular advantage of using a uniform coding means as a commodity identifier is that it minimizes the possibility of errors in matching the commodity to its tax status in any taxing jurisdiction. That is, each commodity code is uniquely associated with a particular product or service, and the same code is used on or in connection with the particular product or service regardless of the taxing jurisdiction in which the product or service is transacted or delivered.

An adaptive system founded on a master database which links uniform commodities coding means (e.g., barcode technology such as UPC) to unlimited taxing jurisdictions thus enables all wholesalers and retailers that interact with the system to contribute to and share in the development of the content of the master database. Since some merchants may sell some coded goods and/or services that another may not, each merchant contributes to the collective compilation of the master database.

In addition, jurisdictional tax information is centrally compiled by the system and not the participants. As such, the participants are not hampered by having to continually employ, contract with or otherwise retain tax specialists to monitor changes in tax law in potentially large numbers of taxing jurisdictions. In addition to the obvious benefits of reduced cost and increased speed and reliability, the ability of merchant participants to access the shared information permits a participant to obtain product and/or service point of sale tax assessment information not only in taxing jurisdictions in which it presently does business but also in taxing jurisdictions in which it may wish to do business in the future.

Additionally, in order for a merchant to be obligated to collect and remit sales tax, the retailer has heretofore been required to have a physical presence in or substantial nexus with the state where a commodity sold by the retailer is delivered (the absence of which physical presence has thus far essentially insulated Internet sales transactions from sales tax liability). The existence of a comprehensive and independently-administered centralized sales tax database eliminates the need for a retailer to have a physical presence in the state where the commodity is delivered, and thereby enables taxation of Internet sales without imposing a burden upon web retailers.

A further advantage exists for a system for accepting online sales tax exemption certificates, for providing real-time reports to state and local taxing jurisdictions and retailers, and for providing a back office system that remits the correct sales tax to the proper taxing authority.

A further advantage exists for a system which uses a combination of conventional mapping methods and supplemental information to provide geographically precise and timely information regarding the boundaries of virtually any taxing jurisdiction.

SUMMARY OF THE INVENTION

The present invention solves the burdensome sales or consumption tax collection responsibility problem for remote sellers who have no substantial nexus with a particular jurisdiction in which they sell goods or services. The invention involves a system comprising individual software and database modules acting in concert to deliver in real-time the precise tax status of a particular good or service sold in a conventional sales transaction or over the Internet. The system includes a comprehensive and independently-administered centralized sales tax database which eliminates the need for a web retailer to have a physical presence in the state where a commodity is delivered, and thereby enables taxation of the retailer's Internet sales without imposing a burden upon the retailer.

Tax base information, rates, exemptions, exemption numbers and transaction numbers are centrally compiled by the system administrator and not the individual retailers. Thus, participants in the system, including web and brick and mortar retailers, taxing jurisdictions and online consumers, are not hampered by having to employ tax professionals to monitor changes in tax law in numerous taxing jurisdictions and independently bear the costs of such efforts. Also, state agencies do not have to bear the cost of random sampling audits of merchant taxpayers. Rather, the system provides state tax authorities with a documented audit trail for entities claiming sales tax exemptions.

The invention provides a real-time adaptive computerized tax system for assessing and determining the proper sales tax of goods and services sold in retail and wholesale establishments and over the Internet. The system has the capacity to conduct interactive online and real-time analysis of all products and services and applicable sales tax rates in any number of taxing jurisdictions. The system has the ability to simultaneously interact with hundreds of thousands of conventional and Internet merchants. Additionally, the system has the capacity to provide interactive tax matrix choices for specific items being purchased, to accept web retailer's customers' tax exemption numbers, to calculate final purchase totals to incorporate tax levies, if any, and to provide a real-time audit report for web retailers and state and local jurisdictions to view and download. The system also has the ability to accept virtually infinite numbers and types of changes in rates, base, audit trail information and exemption certificate information.

The system specifically calculates the appropriate tax, if any, for any electronic transaction, whether online or offline. It enables purchasers to specify prior to final purchase which goods and services they choose to buy under an exempt status. The system further allows the online consumer to visually observe the final tax calculation prior to final purchase. A transaction number is applied to all sales whereby the web or brick and mortar retailer can view any transactional information in real-time. Similarly, the system may also provide any taxing jurisdiction the ability to view the consumer information for transactions in which a specific entity inputs a exemption number. Additionally, the system allows web retailers the ability to debit an automated clearing house (ACH) tax account for goods or services that are returned or refused.

Therefore, the system functions in a way that all web or brick and mortar merchants that utilize product identification numbers, barcode technology or other commodities coding means in their point of sale transactions or on their website can charge the appropriate sales tax without the burden of collection responsibility or sales tax audit liability.

The system includes a master database which links uniform commodities coding means (e.g., barcode technology such as UPC) to tax assessment information for conventional or online point of sale goods and/or services transactions made by any number of wholesalers or retailers in potentially unlimited taxing jurisdictions. In addition, the system comprises a sales tax rate database and rate override and decision logic, an exemption database and exemption decision logic, and specific audit tool engines. The master database can modify its own content to reflect any additions of newly offered sales tax rates, exemptions and product codes, services codes or other uniform commodities codes as well as deletions of discontinued goods, services, reports or exemptions no longer offered. Each participant may also share in the master database information provided by other participants. And, the greater the number of participants in the system, the more comprehensive the content of the master database becomes, which inures to the benefit of all participants. Indeed, the master database of the adaptive system disclosed herein may be expected to support tax status information for hundreds of thousands or even millions of coded point of sale goods and services in unlimited local, state, federal and, optionally, foreign tax jurisdictions.

At their discretion, participants may periodically access the system to update their own internal goods and services tax assessment databases by providing the system with the participants' current versions of their specific databases. That is, the system preferably accept downloads of UPC, or other services codes or product codes from the databases of merchants, as well as the ability to accept changes of sales tax rates and product and/or service exemption changes from any taxing jurisdiction with the capacity to make real-time changes. In so doing, the master database can modify its own content and that of the participants' databases to reflect any additions of newly offered goods or services, discontinuations of goods or services no longer offered, and changes in tax status or tax rates of goods or services still being offered for sale.

Furthermore, since jurisdictional tax information is centrally compiled by the system and not the individual merchants, a participant may access the shared information to obtain product and/or service point of sale tax assessment information not only in taxing jurisdictions in which it presently does business but also in taxing jurisdictions in which it may wish to do business in the future.

The invention further includes a system for providing and accepting sales tax exemption certificates from charitable institutions and other qualified entities in real-time. The system also is capable of sending electronic tax assessment, collection and remittance reports for sales transactions to the merchant involved in the relevant transactions as well as the relevant federal, state and local taxing jurisdictions. And, it provides a back office system that remits the correct sales tax to the proper taxing authority.

Furthermore, in order to provide geographically precise and timely information regarding the boundaries of virtually any taxing jurisdiction, the invention proposes use of a combination of conventional mapping methods (such as ZIP and ZIP+4 codes) coupled with one or more of global positioning system (GPS) technology and census related information. In a further extension of this objective, the present invention contemplates linking ZIP+6 postal codes directly with tax assessment data in order to provide highly accurate tax status information for commodities sales occurring in or otherwise legally related to any taxing to any taxing jurisdiction that utilizes ZIP+6 postal coding.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings, wherein:

FIG. 5 is a view of an interactive window presented by a customer's web browser that enumerates the customer's commodities purchase order list from a website of an online merchant that is a participant in the system according to the present invention;

FIG. 6 is a view of an interactive window presented by a customer's web browser that enables the customer to offer tax exemption certificates electronically during an online sales transaction;

DETAILED DESCRIPTION OF THE INVENTION

Figure 1:
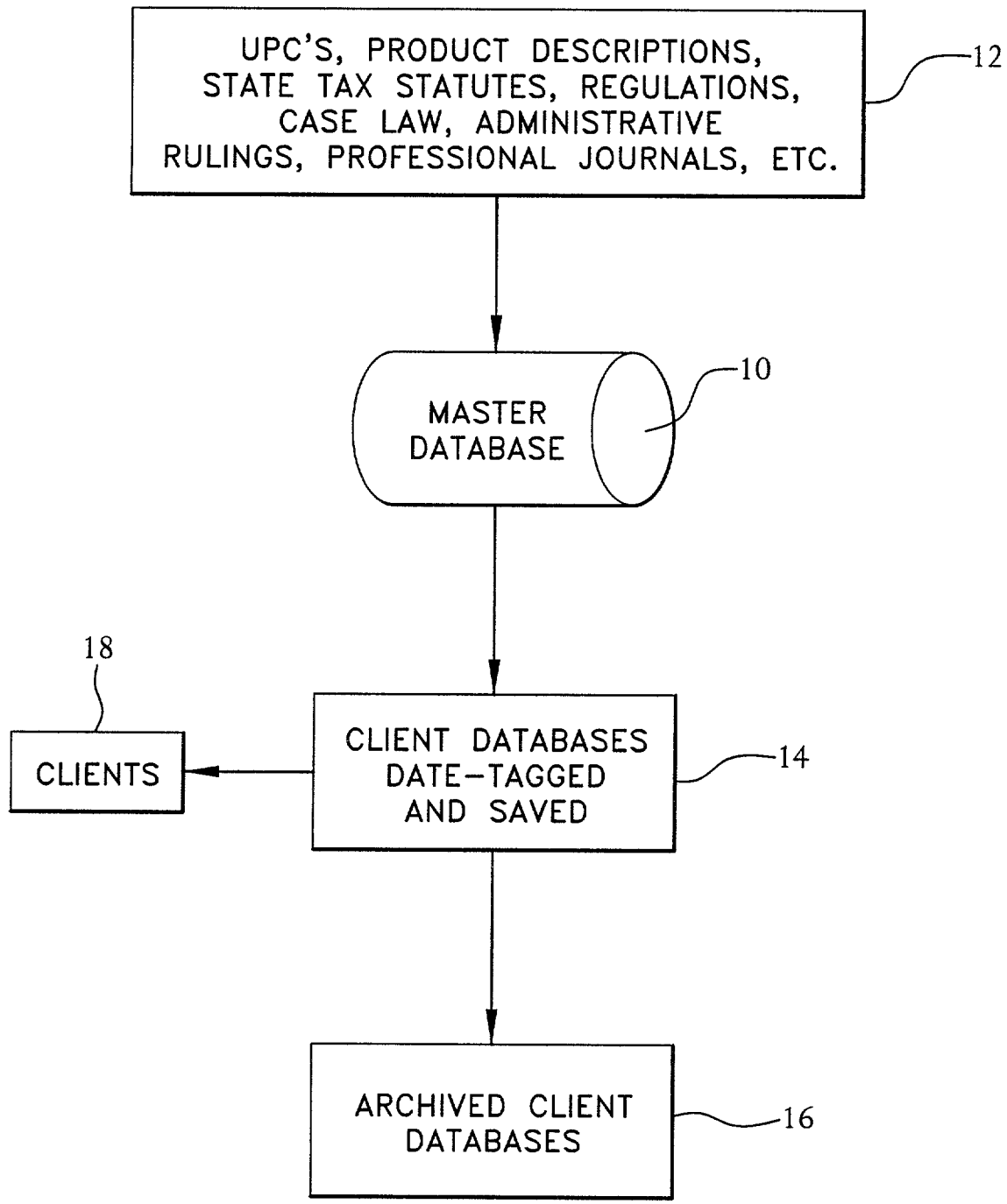
FIG. 1 is a schematic view of a presently preferred process by which the master database of the adaptive system according to the invention is compiled and the master database and all archived client databases are maintained.

The adaptive system of the present invention may reside on any dedicated or general purpose computer, work station or server having sufficient memory storage and processing speed capabilities to support any operating system and executing any computer language and software to efficiently carry out the essential functions prescribed herein. As such, the details of the adaptive system's hardware and software will not be described in detail since they are commercially available and do not, per se, form a part of the present invention. For example, although not limited thereto, the adaptive system may function as a user-interactive and, preferably, client-interactive network based server and may reside on an IBM® compatible or other personal computer capable of running software commercially available under the name Microsoft® Office 2000 Professional produced by Microsoft Corp. of Redmond, Wash. Under all circumstances, however, the adaptive system and its supporting hardware and software should be able to permit compilation, storage and modification of master and client databases including potentially vast numbers of commodities code designations, a product or service description associated with each code designation, and tax assessment information associated with each code and its corresponding product or service (i.e., whether an item is taxable, non-taxable or tax-exempt and, if taxable, the appropriate tax rate therefor) in any taxing jurisdictions of potential interest to the adaptive system's owner/administrator, user or clients.

For simplicity of description and brevity of discussion, FIGS. 1 through 4 generally reference tax assessments based on state law and in connection with UPC-transacted goods or services. It will be understood, however, that the adaptive system according to the invention may also be programmed to compile and process information relating to goods or services transacted by other presently existing or hereinafter developed uniform commodities coding technologies, as well as tax assessment information for any local, federal and/or foreign taxing jurisdictions.

Heretofore, point of sale tax status information has been compiled by tax specialist employees or contractors of a specific merchant. The information obtained was made available only to that merchant and related exclusively to its particular goods and/or services and encompassed only the tax jurisdictions within which it conducted business. A significant distinction and advantage of the tax status information gathering and processing functions performed by the adaptive system of the present invention is that it enables two or more merchants to combine their respective barcode-based tax status databases to produce a collective master database whose expanded content may be utilized by and for the benefit of all of the participating merchants. In the past, the cost and time burdens of compiling and maintaining, in near real time, a comprehensive tax status database for individual merchants operating in multiple tax jurisdictions have been prohibitive.

In this light and referring to FIG. 1, there is shown in schematic form a presently preferred process or method by which a master database of the adaptive system according to the invention is compiled and the master database and all client databases are maintained. As previously mentioned, the adaptive system of the present invention comprises a master database, which is identified in the drawings by reference numeral 10. In amassing the content of master database 10, operators or users of the adaptive system compile barcode and related point of sale goods and/or services information from at least two merchants in addition to relevant tax assessment information encompassed in the master database for those goods and/or services. In the illustrated example, at step 12 the adaptive system may receive from the merchants or clients a plurality of uniform commodities codes such as UPCs and the associated goods/services descriptions for some or, more likely, all of the goods and/or services that may be offered for sale by two or more merchants. The merchants or clients may provide the requisite information by any suitable medium such as ASCII format, the World Wide Web (e.g., secure site, FTP, encrypted database, e-mail), disk (e.g., floppy, CD, ZIP), tape or cartridge, or by direct connection (e.g., perform the operation at the client location with a laptop computer).

Concurrently with and after receiving the uniform commodities code and goods/services descriptions from the clients, operators of the adaptive system conduct research to gather tax assessment information for the identified goods and services from numerous reliable sources including, without limitation, state tax statutes, regulations, case law and administrative rulings, as well as trade journals, periodicals, and other reliable print, broadcast and on-line sources. All of the gathered tax assessment information (including whether an item is taxable, non-taxable or tax-exempt and, if taxable, the appropriate tax rate therefor) is then correlated for each barcode and each good or service in each taxing jurisdiction and stored in master database 10.

At step 14, each specific client database is date-tagged and saved. At the moment of saving and date-tagging, the client's barcoded or otherwise coded point of sale goods and/or services are automatically positioned into compliance with the prevailing tax laws of the taxing jurisdictions in which it does business. The purpose of date-tagging the clients' databases is that it establishes for each client a date upon which a client may rely in the event the client's point of sale tax records are later audited. Upon date-tagging and saving, the respective client files are archived at step 16, a copy of the client database is returned to the client at step 18 and the content of each client database becomes a subpart of the body of information which makes up master database 10.

Tax research conducted in support of the adaptive system is preferably an ongoing process. Accordingly, as tax assessment changes are discovered for any coded product or service in the master database 10 in any taxing jurisdiction included in the master database, those changes are automatically entered into the master database and to all relevant client databases. The tax research may occasionally unearth certain point of sale goods or services whose tax status is uncertain in one or more taxing jurisdictions of interest to the client. In such "gray area" situations, the master database may be programmed to assign a "taxable", "non-taxable" or "tax-exempt" status and a tax rate to the item in question until the issue is clarified by the appropriate taxing authority. Such defaulting to a certain tax status allows individual clients to take conservative to liberal approaches to their point of sale tax assessment. A further advantage of continuous tax information gathering is that adaptive system of the present invention can monitor proposals of tax changes published in advance of the actual changes. In the event the anticipated change transpires, the master database 10 and the relevant client databases can be revised in near real time to reflect the change.

Figure 2:
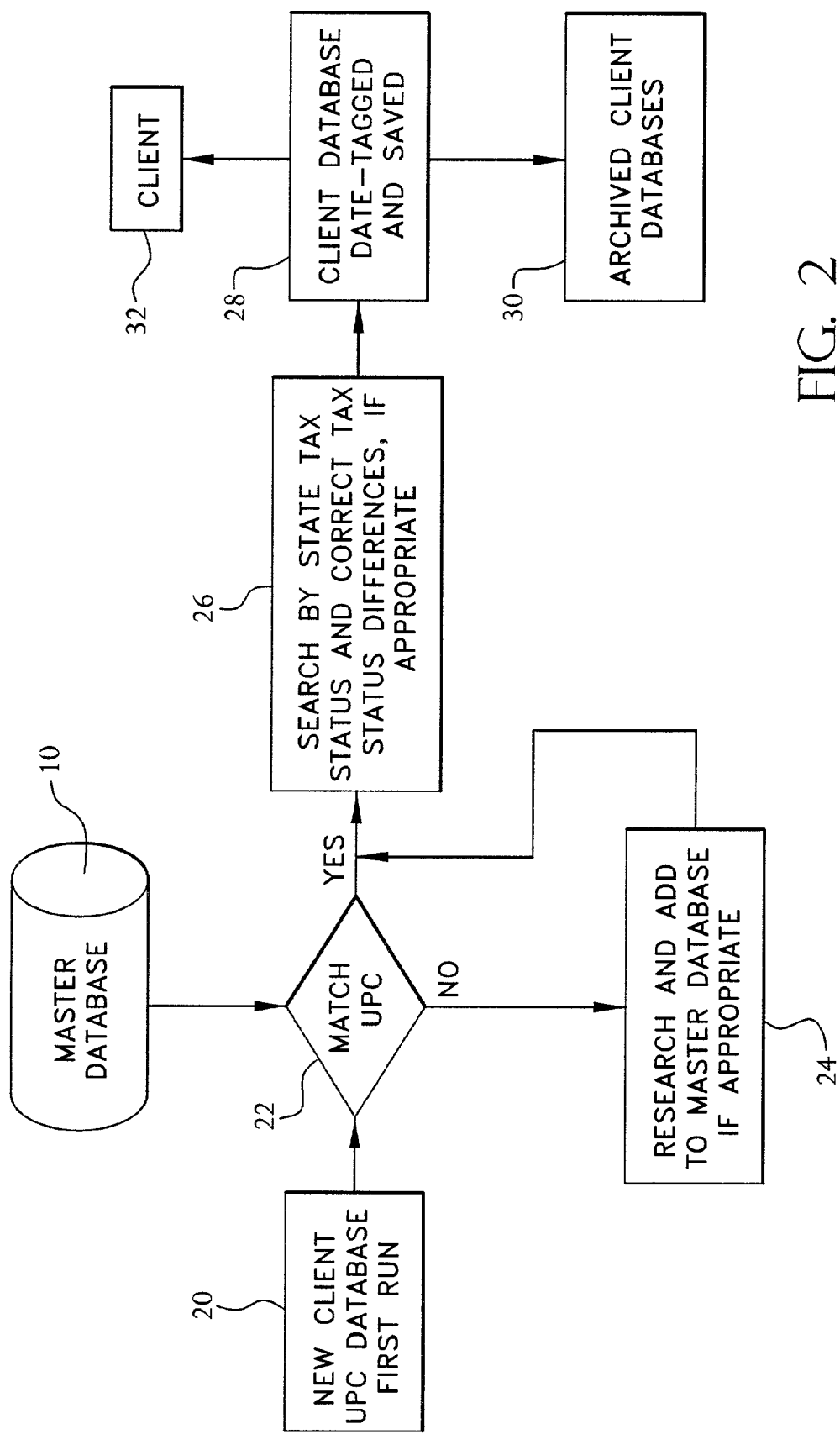
FIG. 2 is a schematic view of a presently preferred process by which a new client's point of sale UPC database is processed by the adaptive system according to the invention.

FIG. 2 depicts a situation wherein a new participant or client merchant's point of sale UPC database is processed by the adaptive system of the present invention. At step 20, the new client 20 delivers its UPCs and associated product/service descriptions to the adaptive system by any of the aforementioned media. At step 22 the master database 10 is invoked and a comparison between the contents of the client database and the master database is made to determine whether any of the client's UPCs match those stored in the master database 10. If one or more of the client's submitted UPCs do not match the master database, the nonmatching UPC or UPCs are researched at step 24 to determine their validity, accuracy and tax assessment characteristics in the taxing jurisdictions encompassed by the master database 10, and, if appropriate, are added to the master database 10.

If any of the new client's UPCs match those of the master database, then the state tax assessment information (or any other pertinent taxing jurisdiction's tax assessment information) of the product or service associated with the UPC or UPCs is checked at step 26 against current tax assessment information in the relevant taxing jurisdiction(s). If appropriate, the tax assessment information of the client's UPCs will be updated to reflect the proper tax status. Thereafter, the client's database is date-tagged at step 28, the client database is archived at step 30 and the client is provided a revised and saved version of its UPC database at step 32.

Figure 3:
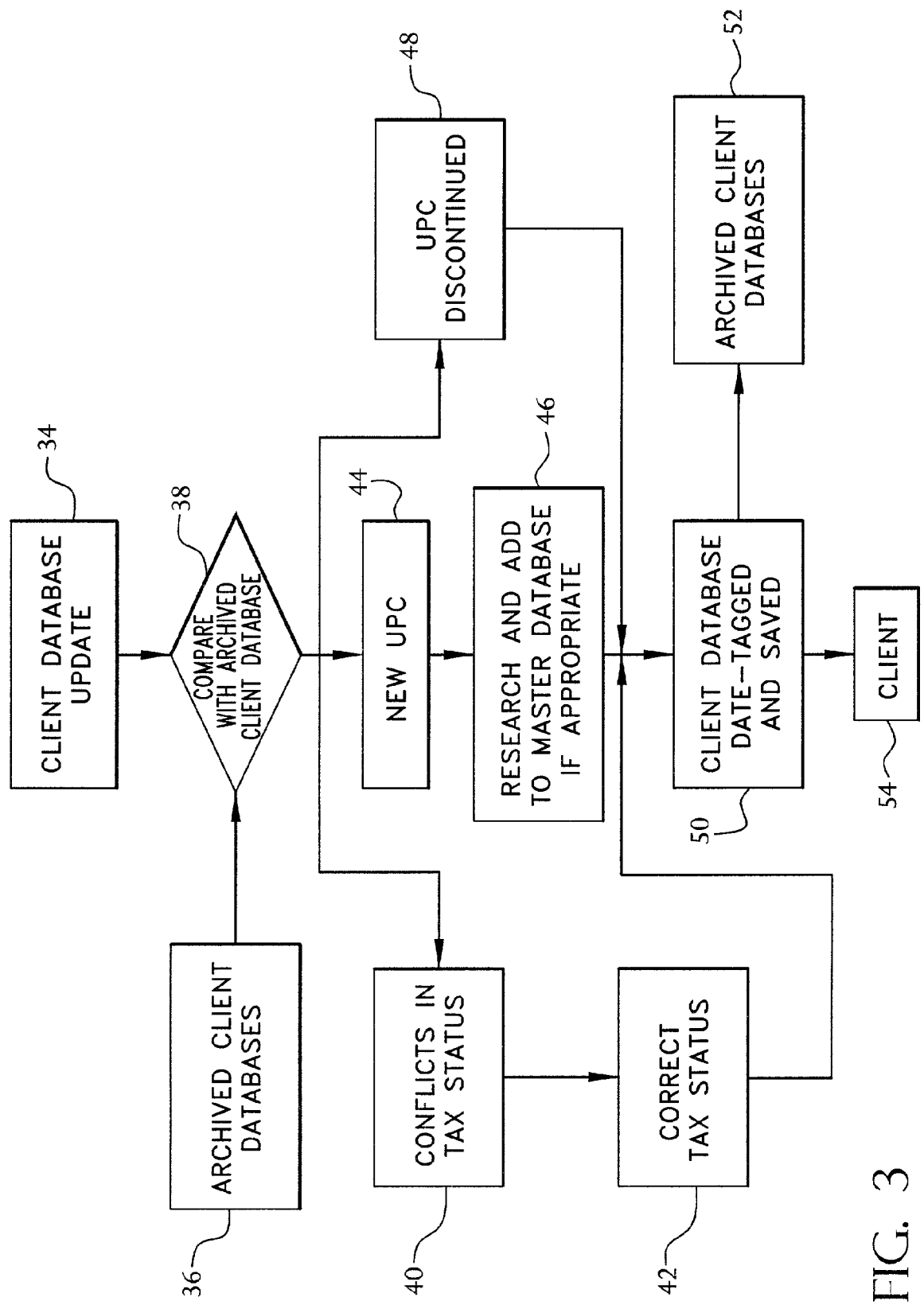
FIG. 3 is a schematic view of a presently preferred process by which an existing client's UPC database is updated and maintained by the adaptive system according to the invention.

FIG. 3 represents a situation where an existing client of the adaptive system desires to update its UPC tax status database. If desired, the process illustrated in FIG. 3 may be used to update any portion or all of the existing client's database. It will be understood that the clients' archived databases and master database 10 are continually and automatically updated by virtue of ongoing changes in bar codes, product or service descriptions and/or tax assessment changes received by the system. At step 34 the client requests that the adaptive system perform the update. Upon receipt of the request, the adaptive system at step 36 invokes the client's archived database and, at step 38, the adaptive system compares the content of the client's present database with that of the client's archived database. If a UPC exists in both the present and archived client databases, the adaptive system determines at step 40 whether any conflicts exist between the present and archived versions of the client databases for that UPC in any taxing jurisdictions of interest to the client. If a conflict does exist, the adaptive system changes the tax assessment characteristics to the proper assessment values at step 42.

If comparison step 38 reveals a new UPC or UPCs not present in the client's archived database (step 44), the new UPC or UPCs are researched at step 46 to determine their validity, accuracy and tax assessment characteristics in the taxing jurisdictions encompassed by the master database 10, and, if appropriate, are added to the master database 10. If comparison step 38 reveals a UPC or UPCs that is present in the client's archived database but not in the client's present database submitted for comparison, the conflicting UPC entry or entries are noted as being discontinued from the client's database at step 48. The data output from steps 42, 46 and 48 is date-tagged at step 50, the updated client database is archived at step 52 and the client is provided with a revised and saved version of its UPC database at step 54.

Figure 4:
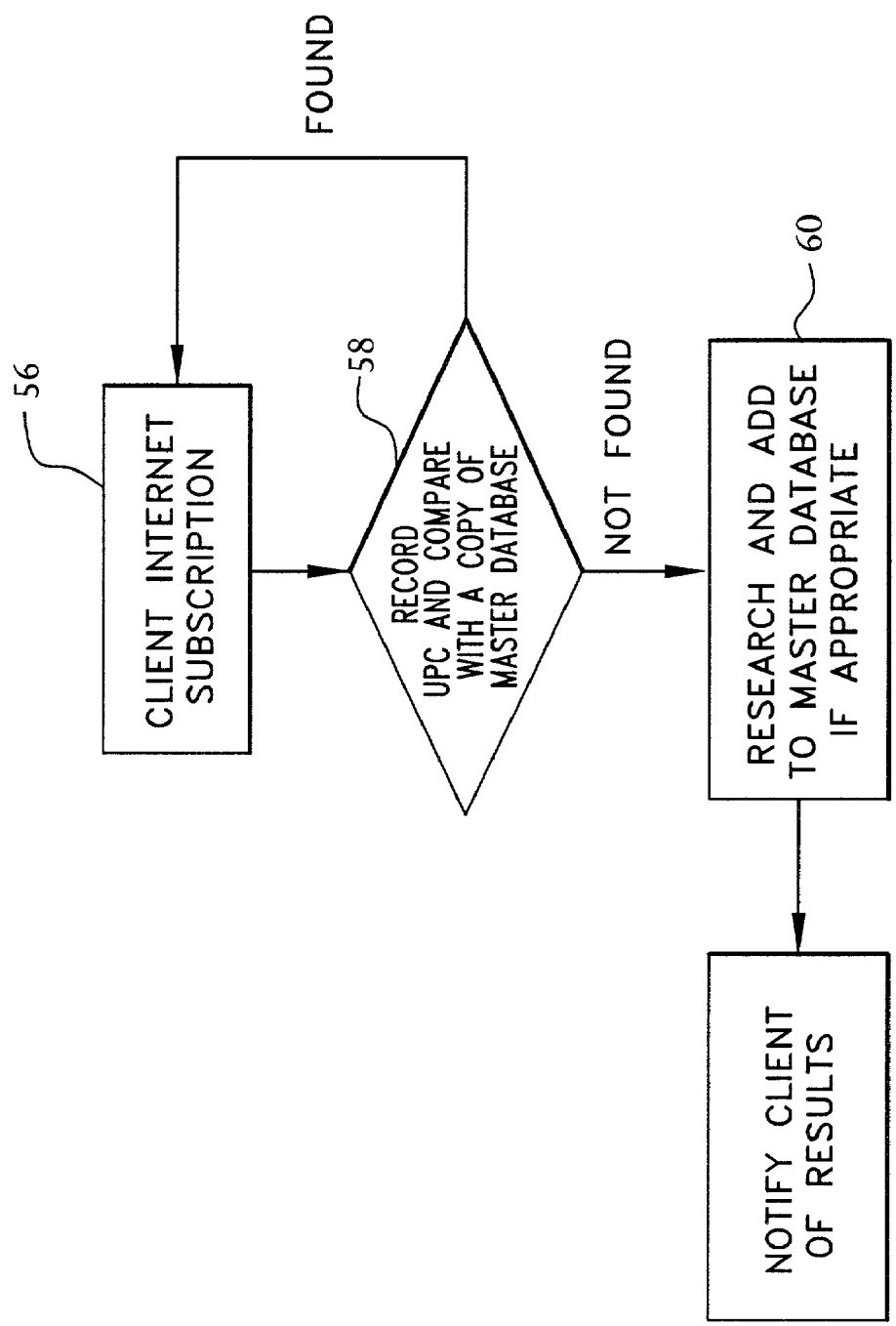
FIG. 4 is a simplified schematic view of a presently preferred process by which an existing client may seek information on new UPCs.

FIG. 4 illustrates the manner in which a client 56 may subscribe to the adaptive system of the present invention through the Internet or other broadband network. As the need arises, client 56 may selectively update its client database. Similar to the way in which any Internet subscriber may enter any posted website, client 56 enters the website address of the operator of the adaptive system and receives a logon screen (not illustrated). The client enters a client number previously assigned to it by the adaptive system operator followed by an access number or password. After validation, a query screen appears in which the client enters the requested UPC. At step 58, the adaptive system records the UPC and compares it with a copy of the master database. If the UPC is found in the master database, a product or service description is returned by the adaptive system along with the current tax assessment characteristics for the product or service in the states or other taxing jurisdictions for which the client subscribes. If the requested UPC is not found in the master database, an input screen appears and the UPC is preferably filled in automatically. The client then enters the product or service description and transmits the information from the completed input screen to the adaptive system. Each such UPC is then researched at step 60 to determine its validity, accuracy and tax assessment characteristics in the taxing jurisdictions encompassed by the master database, and, if appropriate, is added to the master database 10. At step 60, the adaptive system notifies the client of the results of the search by the client's method of choice.

Although the invention has been described in detail in connection with UPC technology it is not limited to the use of UPCs or even other forms of barcoding for commodities identification. Other uniform commodities coding systems currently employed by retailers could also be stored within the invention's proprietary database. These coding systems include, but are not limited to, the International Standard Book Number (ISBN) system, the International Standard Serial Number (ISSN) system, the Global Service Relation Number (GSRN) system, the Universal Service Code (USC) system, and the European Article Numbering (EAN) system. All of these systems are found in wide use around the world for identifying specific products and services. While some products and services have multiple codes, others are solely coded based on one of the systems previously mentioned.

ISBNs, ISSNs, GSRNs, USCs, and EAN codes (as well as any other hereinafter developed uniform commodities coding means) could be added to the master database in a manner similar to that of UPCs as described hereinabove. In order to participate in the system, publishers, retailers, and any other entities who use the invention and use these coding systems will first provide a listing of their products and services commodities and their matching codes to the system administrator, so that they may be included in the master database. The system administrator, having this information, will correlate the UPC, USC, ISBN, ISSN, GSRN, EAN or other universally recognized or merchant-specific uniform codes to the corresponding commodities. In this way, the system can be adapted to meet the needs of all entities with virtually no burden and regardless of which type of uniform commodities coding system the may employ, whether proprietary or widely used, and whether presently existing or hereinafter developed.

The present invention further provides a retailer and a customer a much more efficient and cheaper method to purchase goods and services from the retailer's website. The system according to the invention should be capable of being accessed by any presently available or hereinafter developed, Internet-ready, wired or wireless access device that the customer may choose to employ including, without limitation, personal computer, laptop computer, personal digital assistant, and cellular telephone. Additionally, the invention allows a much more effective method to record exempt transactions for both the retailer and consumer. This saving of time and resources on both the retailer and customer's behalf provides a competitive advantage for the retailer. In particular, the invention provides interactive means, preferably in the form of pop-up menus or the like, whereby sales tax exemptions appear on a retailer's website or on its customers' web browsers for goods and services sold from their website.

As illustrated in FIG. 5, once the consumer has completed its purchase choices on a retailer's website, the retailer's website presents an interactive window in the form of a pop-up menu or the like itemizing a list of the consumer's final selections, in this case, a computer and gloves. The window also preferably includes other relevant information and options such as, for example, the cost of each item, the customer's preferred method of shipment for the items, whether any of the items are to be purchased as a gift (with any attendant giftboxing charges) and the preliminary estimated sales tax for the items. The window also desirably queries the consumer whether any of the selections will be bought by claiming an exemption and, if so, requests the consumer to enter its sales tax exemption number.

As shown in FIG. 6, another interactive window in the form of a pop-up menu or the like appears in which the consumer's choices are desirably placed in a table in a scrolling list view. Adjacent each good or service chosen, there are preferably interactive boxes that provide electronic spaces whereby the consumer is invited to choose a tax status, i.e., "Taxable", "Non-taxable" or "Exempt" for each selection. If the consumer clicks the "Exempt" box, a drop down list 62 appears which enumerates exemptions associated with the state in which the goods or services chosen by the consumer are delivered. The consumer utilizing an exemption, usually a political entity, a charitable institution or a business engaging in an exempt activity, then selects the appropriate exemption numbers from the list. Preferably, the pop-up menu includes a time-saving check box whereby the customer can indicate in one mouse click whether all of the items are "Exempt". In this case, another drop down list 62 appears whereby the customer selects a single exemption code for all selections. The consumer then submits this information along with other relevant purchase information to the retailer's website. This action, in turn, routes the product and/or service identification numbers (e.g., UPCs, category codes, or the retailer's custom codes) as well as the delivery information of the consumer to the system's master database in the manner described in greater detail in connection with FIGS. 8, 9 and 11. Generally, however, the system database engine confirms the customer's input exemption number(s) and exemption reason code(s) by conducting an automated search through another relational database containing that information.

Simultaneously, the total tax due, if any, is calculated and sent electronically to the consumer's web browser for viewing and/or completing the transaction. Once the transaction is complete, the transaction information is tagged, assigned a transaction number, sent to a tax jurisdiction reporter database module of the master database and then transmitted to the retailer and the purchaser.

In the earlier example, therefore, a General Electric purchasing agent making a purchase of goods online using the present invention may quickly and reliably choose to purchase computers used both in research and development (exempt) and in administration (taxable) without having to directly contact a Dell (or other computer retailer) customer service representative. Thus, the purchaser would have the option of choosing the tax status for each item selected. Similarly, a purchasing agent from a charitable institution, such as the American Red Cross, could purchase all items selected on a Dell website under an exempt status without direct interaction with a Dell representative. Thus, the present invention provides a highly efficient online system for purchasers procuring goods and services under an exempt status.

A number of businesses and consortia, such as Vertical Net, Commerce One, and BAE Systems have created vertical, horizontal, industry, and regional buying communities. Many of these communities may eventually become global trading webs and global trading portals. Businesses, particularly large businesses doing business around the world have recently created vertices online in which industry participants and their suppliers can buy and sell goods through unique channels called "vertical nets," whereby numerous consumers (usually businesses) and their suppliers are aggregated in a common virtual space. With such an arrangement, the merchant of record and/or a third party that handles billing will benefit significantly from an online sales tax assessment, remittance and collection system according to the present invention. In this context, the invention can be used as an attachment to the front end and back end of the merchant of record and should support all languages and currencies.

In another important aspect, the present invention significantly increases the accuracy rate of correlating a postal address with the proper taxing jurisdiction versus previously known methods. This is especially important to local taxing jurisdictions that seek to optimize sales tax revenue and merchants who desire to pay the proper taxes to the proper taxing jurisdictions.

Figure 7:
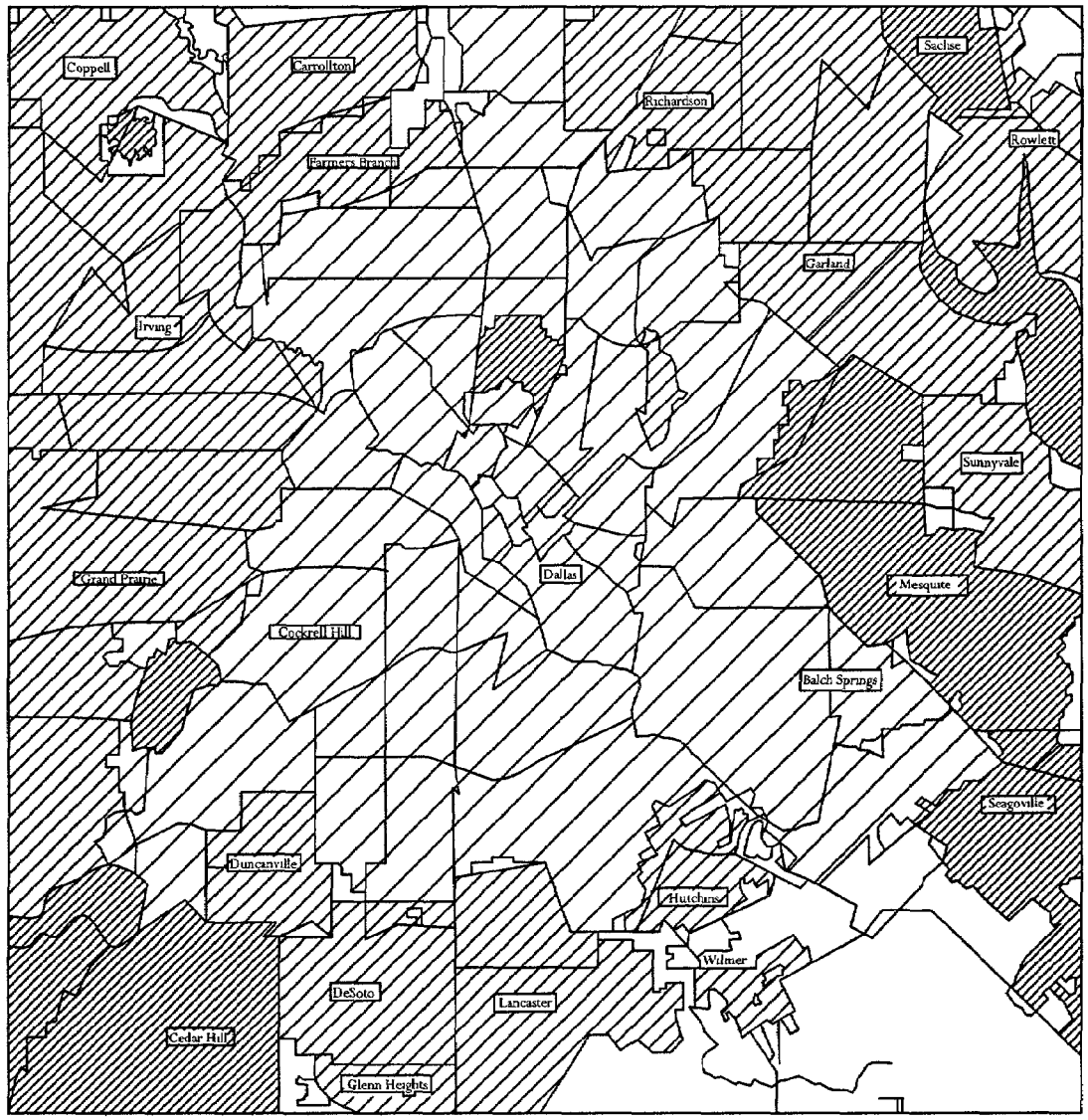
FIG. 7 is a composite conventional and ZIP postal coding map of Dallas County, Tex.

Some taxing jurisdictions are consistent with postal boundaries on county, city, township, and borough levels. However, many taxing jurisdictions do not follow postal boundaries since postal boundaries were created for the express purpose of establishing postal delivery routes and not for taxation purposes. For example, FIG. 7 depicts a composite conventional municipal and ZIP coding map of Dallas County, Tex. wherein the ZIP coding zones are demarcated by the heaviest black lines shown in the figure. From FIG. 7 it is readily apparent that strict adherence to ZIP coding boundaries would create taxing jurisdictions which are inconsistent with municipal boundaries. Indeed, on the eastern edge of Dallas, it is seen that a single ZIP code boundary incorporates portions of three municipalities, Balch Springs, Mesquite and Dallas. Still other areas rely on alternative schemes to determine sales tax rates. For instance, Denver, Colo. uses bus routes to define different taxing jurisdictions. Because of the many varied geographic and political factors that contribute to setting out jurisdictional taxing boundaries, no presently available mechanism exists by which to apply the proper sales tax rate in virtually all sales transactions. Rather than abandoning local jurisdictional taxing in those areas, however, it is possible that taxing jurisdiction boundaries might be defined by some other criteria.

To resolve these problem, the present invention proposes the use of pre-mapped land coordinates and global positioning system (GPS) technology. The GPS is comprised of 24 widely-spaced satellites that orbit the Earth and make it possible for people with ground receivers to pinpoint their geographic location. Presently available commercial GPS receiver technology offers positioning accuracy to as low as 3 meters for some equipment. The GPS is owned and operated by the U.S. Department of Defense but is available for general use around the world.

At present, 21 GPS satellites and three spare satellites are in orbit at 10,600 miles above the Earth. The satellites are spaced so that from any point on Earth, at least four satellites will be above the horizon. Each satellite contains a computer, an atomic clock, and a radio. With an understanding of its own orbit and the clock, a satellite continually broadcasts its changing position and time. On the ground, a GPS receiver contains a computer that determines its own position by obtaining bearings from three of the four satellites. The result is provided in the form of a geographic position—longitude and latitude—to, for most receivers, within 3 meters. If the receiver is also equipped with a display screen that shows a map, the position can be shown on the map.

All physical locations on Earth, including taxing jurisdictions and locations therein represented by postal addresses, may be geopositionally defined by latitude and longitude coordinates. Using GPS technology, where mapped boundaries are not used or cannot be relied upon to determine sales tax rates, a taxing jurisdiction's boundaries can be accurately discerned by an individual equipped with a GPS receiver that reads out the coordinates at each point traversed along a walked or driven path. In this way, essentially the exact latitude and longitude coordinates can be determined for postal addresses located near several municipal boundaries. Any commercially available GPS receiver having the capability to provide the degree of geopositioning resolution necessary to achieve the objectives of the present invention may be used to practice the present invention. Examples of such receivers include any of several GPS receivers marketed by Garmin International Corporation of Olathe, Kans.

According to a preferred embodiment, the present invention utilizes commercially available mapping software data which contain postal codes (e.g., in the United States, ZIP-related postal codes, and outside the United States, postal codes that operate as the functional equivalents of ZIP-related postal codes), and combines that information with geopositioning coordinates data to achieve between approximately 95% and 99.99% accuracy in determining jurisdictional boundaries for taxing jurisdictions. The data from the conventional mapping software and GPS technology is compiled to establish latitude and longitude coordinate data for all taxing jurisdictions' boundaries and stored in a geocoded latitude and longitude coordinates database module of the master database. The latitude and longitude coordinates data are then used in conjunction with specific decision logic to assess the proper sales tax associated with a particular sales transaction.

According to a further preferred embodiment, the invention proposes linking ZIP+6 postal codes directly with tax assessment data in order to provide highly accurate tax status information for commodities sales occurring in or otherwise legally related to any taxing jurisdiction that utilizes ZIP+6 postal coding.

Figure 8:
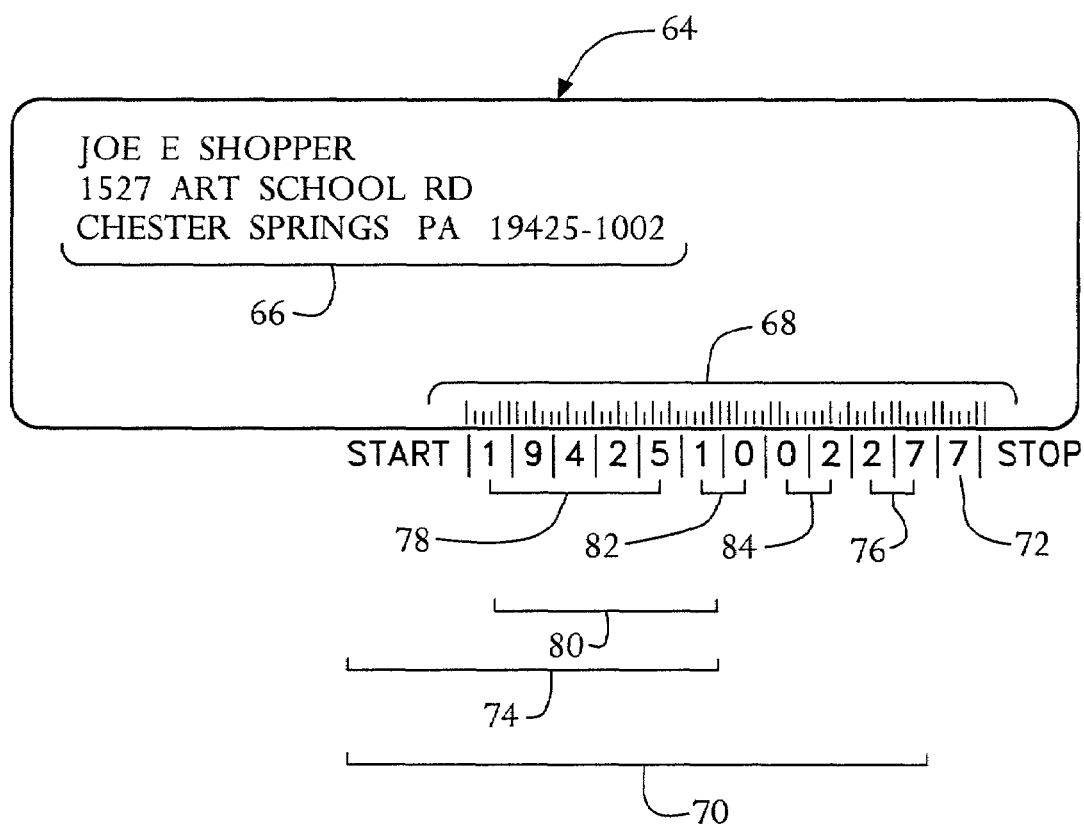
FIG. 8 is an illustration of a typical ZIP+6 postal coded mailing address label.

FIG. 8 is an illustration of a typical ZIP+6 postal coded mailing address label 64. As is conventional, label 64 includes a first uncoded portion 66 and second coded portion 68. First uncoded portion 66 includes the addressee's name, delivery address and ZIP+4 code. The USPS only requires the nine-digit ZIP+4 code portion of the eleven-digit ZIP+6 code be printed in human readable form. Second coded portion 68 is a Delivery Point Barcode (DPBC). The DPBC is a POSTNET barcode that consists of 62 bars with beginning and ending frame bars and 5 bars each for the nine digits of the ZIP+4 code, the delivery point code, and a modulo 10 check digit, each of which are defined below. The DPBC allows automated sorting of letter mail to the carrier level in walk sequence. POSTNET is the acronym for Postal Numeric Encoding Technique which is the barcode system used on letter-size and flat-size mailpieces for encoding the delivery point information and ZIP+4 code information. POSTNET was developed by the USPS to allow faster sorting and routing of mail.

More particularly, second coded portion 68 is a barcode which corresponds to twelve digits of numerical data, including an eleven-digit ZIP+6 code 70 and a single modulo 10 check digit 72. ZIP+6 code 70 is comprised a nine-digit ZIP+4 code 74 and a two-digit delivery code 76. ZIP+4 code 74 is comprised of a five-digit ZIP 78 and a four-digit Add-on code 80 which, in turn, is comprised of a two-digit sector number 82 and a two-digit segment number 84. Definitions for these and related terms are as follows:

ZIP code—A five-digit code that identifies a specific geographic delivery area. ZIP codes can represent an area within a state, an area that crosses state boundaries (an unusual condition), or a single building or company that has a very high mail volume.

ZIP+4 code—A nine-digit code, composed of the ZIP Code and the ZIP Add-on code, that identifies a small geographic delivery area that is serviceable by a single carrier; it appears in the last line of the address on a mail piece.

Sector Number—A number that forms the first two digits of the ZIP add-on code. A ZIP sector is a subdivision of a five-digit ZIP Code area.

Segment Number—A number that forms the last two digits of the ZIP Add-on code. The ZIP segment is a subdivision of a ZIP sector, i.e., it represents areas such as one side of a city block between intersections; both sides of a street, including cul-de-sacs, a company or building, a floor or group of floors within a building; a cluster of mailboxes, sections of post office boxes, or other similar delivery groups. ZIP segments are established so that they do not cross state or county lines.

Delivery Point Code—For delivery to primary addresses, the last 2 digits of the primary street address number (or post office box, etc). For delivery to secondary addresses, the Delivery Point Code is the result of one of several standardized formulas depending on the type of secondary address. In mail processing, the finest depth of code to which a mail piece can be sorted by its address.

Modulo 10 Check Digit—A single digit which is obtained in two steps. First, from all of the numbers of the eleven-digit ZIP+6 code 70 are summed, i.e., 1+9+4+2+5+1+0+0+2+2+7=33. Second, that value is subtracted from the next highest multiple of 10, i.e., 40−33=7. Hence, in the present example, the value of modulo 10 check digit 72 is 7. A modulo 10 check digit is present in a barcodes, including a DPBC and the commodities barcodes discussed hereinabove.

There are over 125 million ZIP+6 postal codes in the United States, each of which represents a separate physical mailing address. Because of this extremely high level of geographical resolution, the present invention proposes combining ZIP+6 code information with the taxing jurisdiction and commodities tax status information in the master database to produce a nearly 100% accurate system for determining the proper tax status for any uniformly-coded commodities sold in the United States. The ZIP+6 database may be used in whole or in part. If all of the ZIP+6 database is used, however, it consumes considerable database storage space. Moreover, the level of resolution afforded by ZIP+4 coding may be sufficient to locate a physical address within a particular taxing jurisdiction, particularly if supplemented by latitude and longitude coordinate (described above) or census code information (described below). Accordingly, if ZIP+6 codes are used as physical address locators, it is preferred that they be used as a means for discriminating physical addresses in instances wherein a ZIP+4 postal code boundary covers more than one taxing jurisdiction. Additionally, if desired or necessary, ZIP+6 coding may be used in combination with one or more of global positioning system technology (as described above) and census related information (as described below) to provide an even greater level of accuracy in tax assessment determinations.

Figure 9:
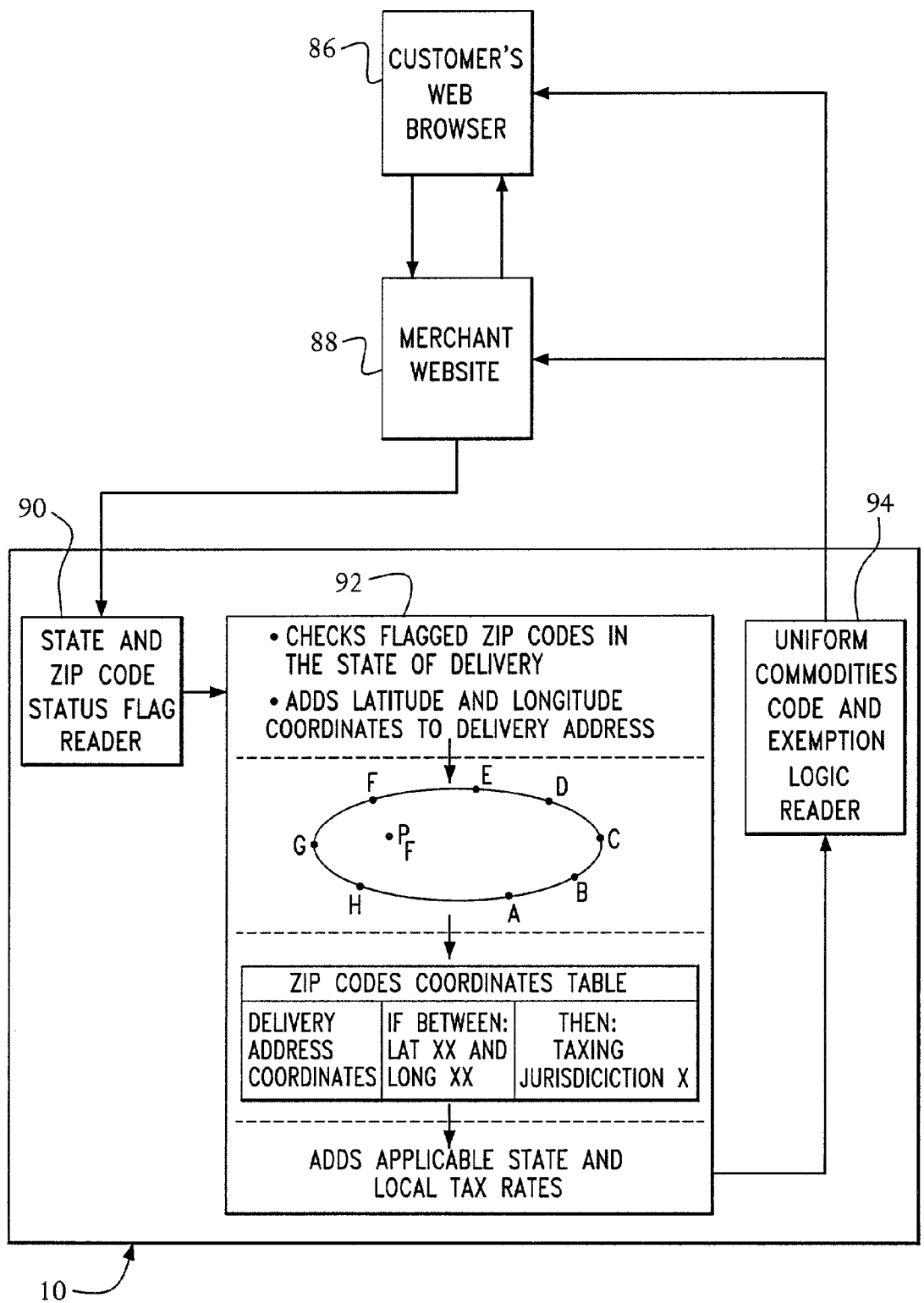
FIG. 9 is a first schematic view depicting how a web merchant can communicate with the central system database according to the invention to acquire the correct tax rate for an online purchase, given the purchaser's send-to address.

The system of the present invention may reside in different forms depending on the type of merchant and customer that is using the invention. For example, FIG. 9 schematically depicts how the present system would be used to execute a commodities transaction entirely online. However, the data contained in and the logic processing steps performed by the master database 10 would be the same regardless of whether the transaction is an e-commerce sale or a conventional point of purchase sale using scanned barcoded commodities. More particularly, a customer uses a web browser 86 to contact a merchant website 88 over a suitable broadband network such as the Internet. When interacting with the merchant website 88, the customer selects one or more commodities for purchase and offers any tax exemption certificates in the manner shown and described above in connection with FIGS. 5 and 6, as well as a delivery address for the commodities being purchased. Additionally, the customer provides a physical address related to the commodity or commodities purchase, which in turn is forwarded by the merchant website 88 to the master database 10 of the system administrator, that is used by the system administrator to determine the appropriate tax jurisdiction(s) and tax status for the commodities being purchased. Presently, for tangible personal property, this physical address is the delivery address. For services, the system may use any of several addresses for these purposes, including, but not limited to, the billing address, the delivery address, the point of consumption or rendering of services, or the location of the service provider. Upon arrival of the purchase information at master database 10, the system according invention uses reader technology, at step 90, to identify the state in which the physical address is located and to flag the address if it contains a ZIP related postal code that contains two or more taxing jurisdictions maintaining different sales tax rates. At step 92 the system checks the flagged address, $P_F$, to determine whether its postal code is contained in the master database. If it is, the system adds stored latitude and longitude coordinates to the address $P_F$, which coordinates are symbolically illustrated as placing the address within a taxing jurisdiction circumscribed by a plurality of boundary points A, B, C, D, E, F, G and H. More specifically, the database places the latitude and longitude coordinates of the flagged address $P_F$ into a point-in-polygon logic routine whereby, if the address's coordinates fall within coordinates defining a certain taxing jurisdiction, then the purchase is taxed at that jurisdiction's tax rate, and any appropriate state tax rate. Thereafter, at step 94, the system uses reader technology to match the commodities with the merchant's uniform commodities codes and apply any exemption certificates to the commodities. The finalized purchase information, including a listing of commodities being purchased and any appropriate state and local sales taxes and/or exemptions for the commodities are transmitted by the system to either or both of the customer's web browser 86 and merchant website 88. At this point, the customer concludes the transaction by electronically accepting the transaction information, subject to contemporaneous payment for the transaction by a financial institution of its choice, as discussed in association with FIG. 12.

Virtually all physical postal addresses are associated with a taxing jurisdiction. Optimally, the sales tax rates of all state and local jurisdiction tax rates are coupled with matching latitude and longitude points within a geopositioning database. For maximum security, the software and hardware that sustain this database are desirably hosted at a data center at a location remote from all web retailers.

Logic rules are used to default to the latitude and longitude perimeter maps in which the reader identifies flagged ZIP-related codes transmitted electronically to the database. Thereafter, the system applies the correct taxing rate to products or services in real-time based on the non-flagged or flagged address and ZIP codes for final tax calculation using the compiled jurisdictional tax data and remits this information to the web retailer.

Preferably, the invention is configured to accept real-time changes in state and local tax rates. And, tax boundary changes can be updated within a few days of receiving an updated digital map from a local jurisdiction.

Figure 10:
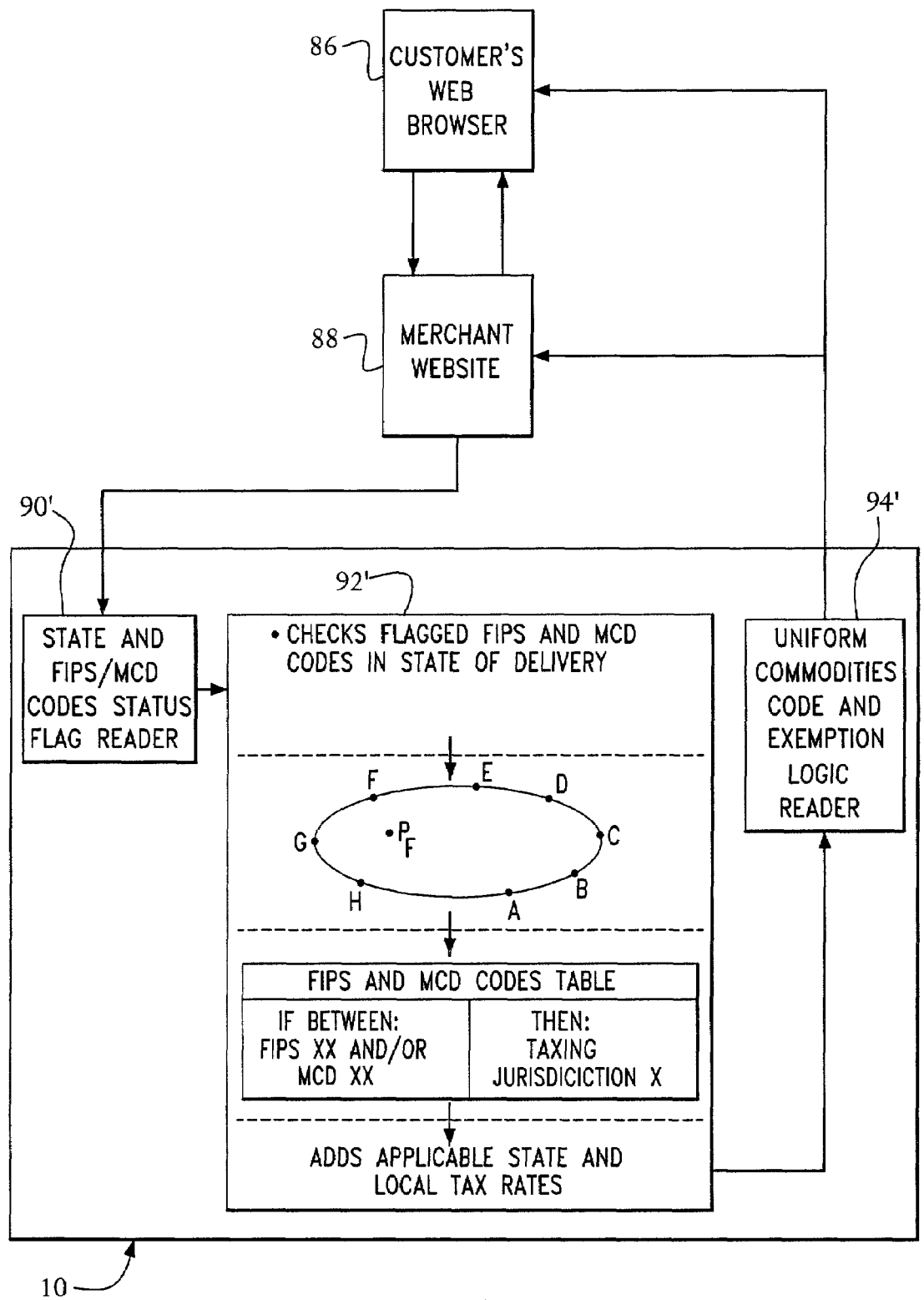
FIG. 10 is a further schematic view depicting how a web merchant can communicate with the central system database according to the invention to acquire the correct tax rate for an online purchase, given the purchaser's send-to address.

As shown in FIG. 10, the present invention may also employ commercially available census information to identify unique taxing jurisdictions. In the United States, each physical postal address resides within a particular state and county. Furthermore, each address falls within a smaller subdivision of a county, such as a city, township, borough or parish. Most taxing jurisdictions fall within clearly defined boundaries and their tax rates are applied within these areas. In lieu of or in addition to improved sales tax rate determination through use, at least in part, of GPS technology, the invention may utilize commercially available census information to identify taxing jurisdictions and assign unique codes to each of them. For example, census data associated with the taxing jurisdictions is processed in such a way that counties receive a unique FIPS (Federal Information Processing Standard) code that contains a combination of letters and numbers. Similarly, smaller jurisdictions are marked with a MCD (Minor Civil Division) code containing a number combination. One or, preferably, both of these codes are correlated with each physical address and postal code associated with that address and compiled within a database whereby the address may be precisely assigned to the proper taxing jurisdiction.

At step 90' the invention implements flags on FIPS and/or MCD codes that fall within two or more taxing jurisdictions maintaining different sales tax rates. At step 92' a point-in-polygon algorithm is used to determine the correct taxing jurisdiction within which the purchaser's address is situated. Thereafter, the system applies the correct taxing rate to products or services in real-time based on the non-flagged or flagged FIPS and MCD codes for final tax calculation using the compiled jurisdictional tax data and remits this information to the web retailer. At step 94', the system matches the commodities with the merchant's uniform commodities codes and applies any exemption certificates to the commodities.

In all other respects, this embodiment is substantially similar in operation to the geopostioning-based taxation model described above in respect to FIG. 9. That is, physical postal addresses are associated with a taxing jurisdiction. The present invention houses the sales tax rates of all state and local jurisdiction tax rates with matching FIPS and MCD codes within a FIPS and MCD codes database module of the master database 10. Again, for optimum security, the software and hardware that sustain this database are preferably hosted at a data center at a location remote from all web retailers. And, the invention is preferably configured to accept real-time changes in FIPS and MCD codes and state and local tax rates, whereby tax boundary changes can be updated within a few days of receiving an updated listing of the census codes from a local jurisdiction.

Figure 11:
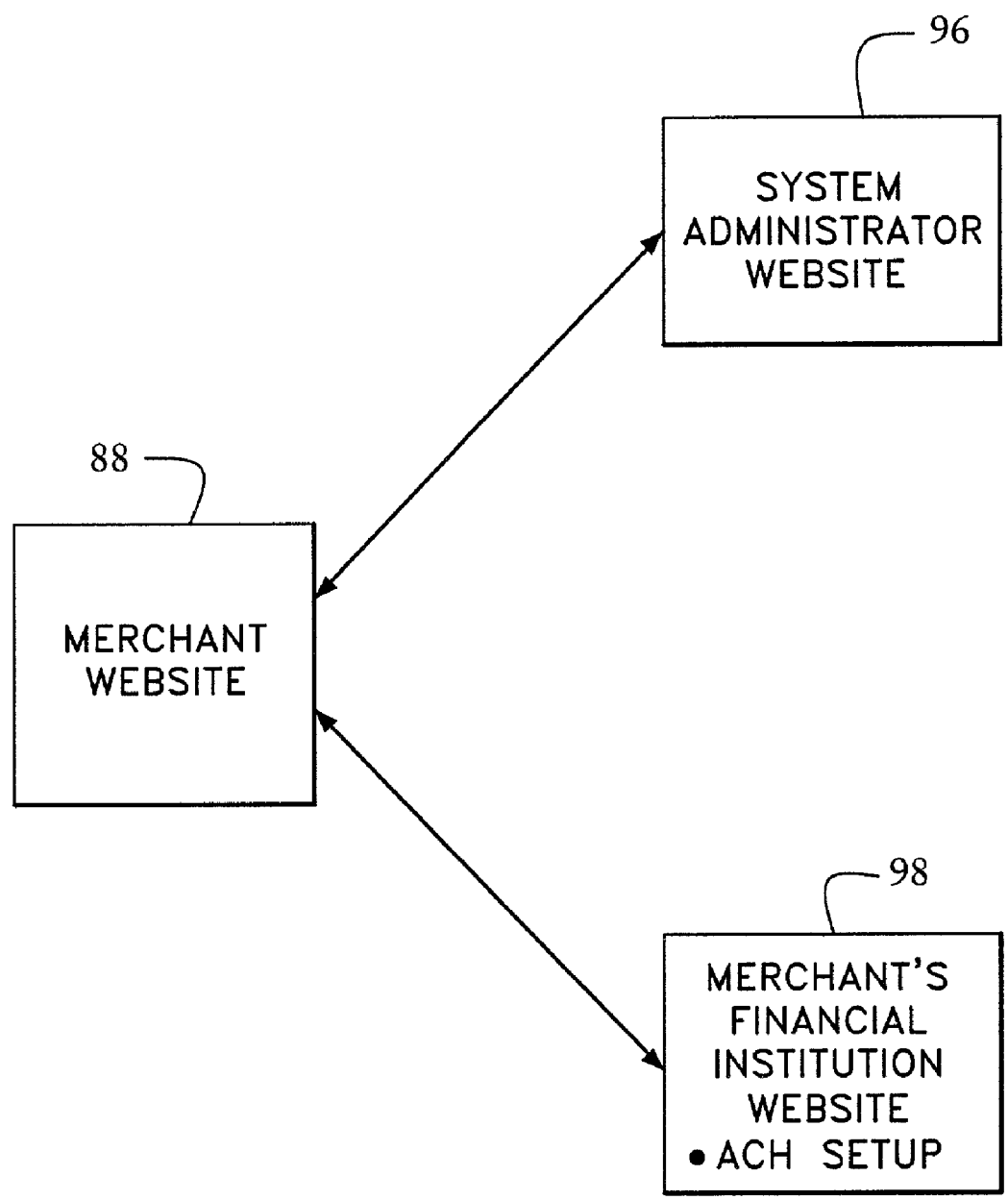
FIG. 11 is a schematic view of a presently preferred process by which a web merchant downloads the necessary communication software from the central system website according to the invention and establishes an automated clearing house account with a financial institution in order be able to conduct electronic commerce sales transactions using the system of the present invention.

As shown in FIG. 11, the system according to the present invention preferably includes a central system administrator website 96 from which merchants may download software code necessary to participate in the e-commerce system described above. Since website designers use numerous markup languages to create websites, the code at website 96 is preferably written in all languages presently known or that may be hereinafter developed to design and create websites. Alternatively, web retailers may write their own compatible code to communicate with the central website if this presents itself to be a less burdensome solution.

In order to trigger a final tax payment to the proper taxing jurisdiction(s), a web merchant must also set up an ACH escrow or debit/credit account with the financial institution 98 of its choice. The payment routing information must be sent to the system administrator's website since the invention utilizes these numbers to communicate the appropriate transaction information to the proper taxing authorities and financial institutions. Optionally, to facilitate creation of participating web retailers' ACH accounts, the central system administrator website 96 may offer a listing of hyperlinks to the websites of a plurality of financial institutions and/or a listing of telephone numbers of those institutions or representatives thereof.

Figure 12:
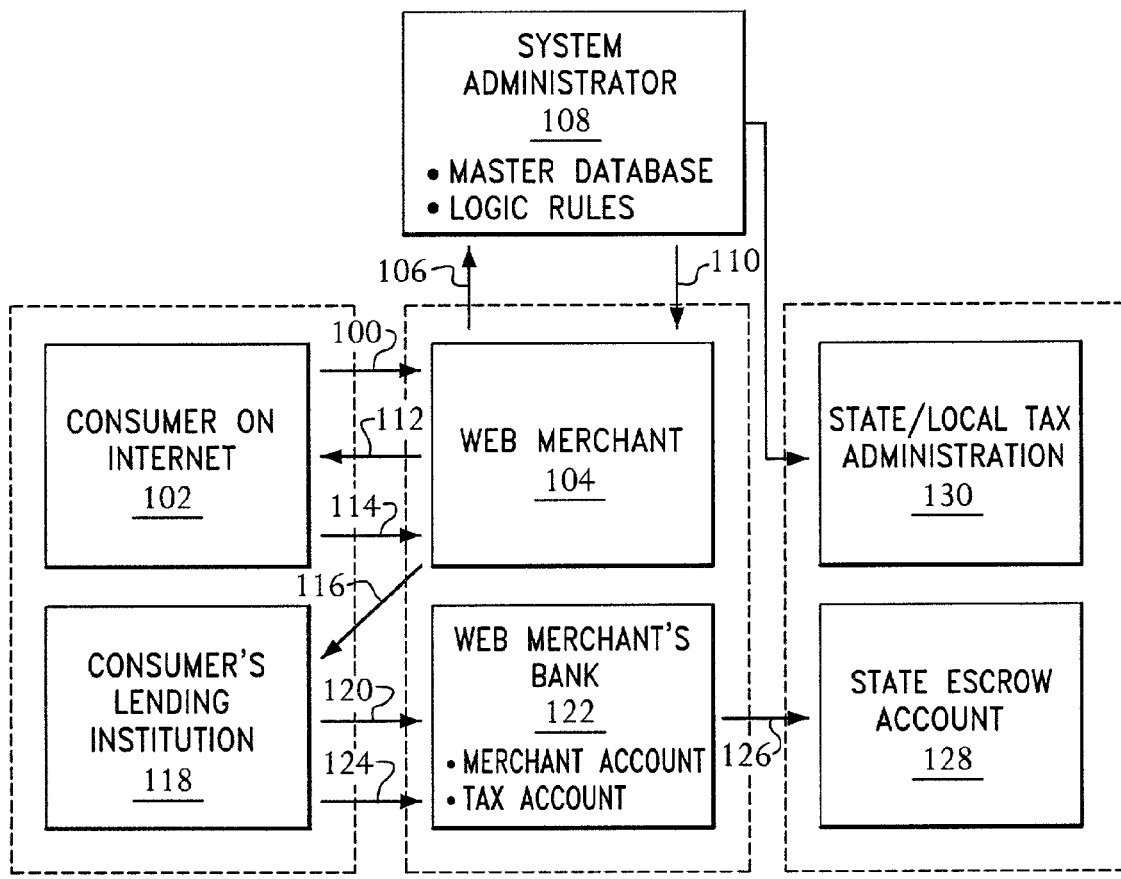
FIG. 12 is a schematic view of the infrastructure of adaptive point of sale tax assessment, collection and remittance system according to the invention showing the manner in which a consumer's and a merchant's transaction information is sent electronically to the central system database as well as the flow of sales tax to the financial institutions of the proper taxing authorities.

FIG. 12 describes several steps that are performed by the system according to the invention in enabling real-time tax assessment and collection, and subsequent remittance, of tax associated with a web-based sales transaction. The system is designed to send the tax collected from the sale of a service or a product to a taxing jurisdiction. In order for this process to unfold a retailer must first set up a separate ACH debit/credit account with its financial institution for the purpose of capturing tax. The debit/credit capability is designed so that a retailer's customer can return a good or service and receive credit for both the full cost of the service or good and the associated tax.

Once a sale is rendered the system allows the flow of tax payment to a tax jurisdiction. The system directs the customer's lending institution (bank or credit card company) to issue payment of services and the associated tax to the main receivables account of the retailer and separate payment to the ACH credit/debit account which was setup by the retailer to capture the tax. This account has a predetermined tax payment schedule with the escrow account(s) of the relevant tax jurisdiction(s) to which the retailer has tax payment obligations.

At step 100, a consumer 102 on the Internet selects items for purchase and sends the list and his or her physical address to the web merchant 104. At step 106, web merchant 104 forwards the information to system administrator 108 for tax assessment. At step 110, system administrator 108 returns the appropriate tax status (including taxability and tax rate, if appropriate) for each item selected by the consumer to the web merchant 104. At step 112, web merchant 104 presents the total purchase price including tax and shipping to the consumer. At step 114, the consumer transmits his credit information to the web merchant.

At step 116, web merchant 104 initiates the transaction with the consumer's lending institution 118 (bank or credit card company) which, at step 120, transfers transactional costs such as purchase price and shipping charges to the web merchant's bank 122. Concurrently, at step 124, the consumer's lending institution transfers the appropriate sales or consumption tax amount to a separate account at the web merchant's bank.

At step 126, web merchant's bank 122 periodically (e.g., per transaction, daily, weekly, monthly, quarterly, semi-annually, annually) transfers the accumulated tax to the state escrow account 128. Likewise, system administrator 108 periodically (e.g., per transaction, daily, weekly, monthly, quarterly, semi-annually, annually) sends transaction reports to the state/local tax administration 130.

It will be understood that similar steps are performed by the system of the present invention in connection with a brick and mortar point of sale barcode based sales transaction. However, the customer will verbally provide exemption information to the merchant who will, in turn, incorporate that information into the transaction. That is, although not illustrated, if the retailer has a brick and mortar operation and conducts sales transactions involving barcode scanning, the invention may be packaged as an add-on to the retailer's existing software platform, such as, for example, a conventional database marketed by Oracle Corp. of Redwood Shores, Calif. The package is installed onto the retailer's computer and can be opened with the retailer's existing software. Because the software employed by each retailer may vary, the modular software version of invention is preferably made available in a number of different formats so that it can be opened within any software that the retailer chooses to use. Under those circumstances, there will be no communication with the central system administrator website 96 or similar remote servers that are used by web retailers since the software add-on will contain all of the information in the proprietary database that is housed within the remote server.

TABLE 1 is a representative sales tax report that might be generated by the system according to the invention for a single transaction conducted by a consumer in the State of Wisconsin.

TABLE 1

| Tax Authority: | Wisconsin |
|---|---|
| Transaction Number: | 00121001 |
| Total Invoice: | $342,899 |
| Amount Exempt: | $101,277 |
| Date: | 01-16-2001 |
| Reason: | ST-4 |
| Delivery Address: | Milwaukee, WI |
| Federal ID: | 12345678 |
| Total Tax Collected: | $13,000 |

For optimum performance, the system according to the invention will preferably reside on a multiple server environment with massive parallel processors and multiple broadband Internet connections. Thus, although described herein for simplicity as a single master database 10, the adaptive system of the present invention preferably resides on a number of redundant relational databases capable of real-time delivery of information and has the ability to store and deliver thousands of multiple sales tax decisions while simultaneously corresponding with multiple retailers' websites.

The applications of this invention are virtually unbounded. Web retailers large and small can use the invention to correctly apply tax to purchases made through their web sites. For instance, telecommunication companies such as AT&T and others can use the invention to apply accurate tax to billing statements that detail individual telephone calls. Also, mail order companies can determine the precise tax in real time for purchases sent around the globe.

Although the invention has been described in detail for the purpose of illustration, it is to be understood that such detail is solely for the purpose and that variations can be made therein by those skilled in the art without departing from the spirit and scope of the invention as claimed herein.

What is claimed is:

1. A method of assessing point of sale taxation, said method comprising the steps of:
   (a) compiling a tax assessment database for commodities identified by uniform commodities codes, said compiling comprising the steps of:
      gathering uniform commodities code information and commodities description information corresponding to said uniform commodities code information from a plurality of clients;
      gathering tax assessment information for each of said commodities for a plurality of taxing jurisdictions;
      correlating said uniform commodities code information and said commodities description information with said tax assessment information;
      storing said uniform commodities code information, said commodities description information and said tax assessment information in a master database hosted on a computer-readable medium;
      comparing a client database with an archived client database hosted on a computer-readable medium; and
      modifying said client database to include updated tax assessment information from said master database;
   (b) providing a client with said modified client database;
   (c) assessing appropriate sales tax for commodities sold by point of sale transactions in at least one of said taxing jurisdictions in reliance upon said uniform commodities code information, said commodities description information and said tax assessment information stored in at least one of said master database and said client database.

2. The method of claim 1 wherein said uniform commodities code information is selected from the group consisting of the Universal Product Code (UPC) system, the Universal Service Code (USC) system, the International Standard Book Number (ISBN) system, the International Standard Serial Number (ISSN) system, the Global Service Relation Number (GSRN) system, and the European Article Numbering (EAN) system.

3. The method of claim 1 wherein said tax assessment information comprises an indication of whether a commodity is taxable, non-taxable or tax-exempt.

4. The method of claim 3 wherein, if a commodity is indicated as being taxable, said tax assessment information further includes a tax rate associated with the commodity.

5. The method of claim 1 further comprising date-tagging said client database.

6. The method of claim 5 further comprising providing a client with said date-tagged client database.

7. The method of claim 1 further comprising archiving said client database on a computer-readable medium.

8. The method of claim 1 further comprising modifying said master database to include uniform commodities code information and commodities information from said client database.

9. The method of claim 1 wherein said taxing jurisdictions comprise local taxing jurisdictions.

10. The method of claim 1 wherein said taxing jurisdictions comprise state taxing jurisdictions.

11. The method of claim 1 wherein said taxing jurisdictions comprise federal taxing jurisdictions.

12. The method of claim 1 wherein said taxing jurisdictions comprise foreign taxing jurisdictions.

13. A method of assessing point of sale taxation, said method comprising the steps of:
   (a) compiling a tax assessment database for commodities identified by uniform commodities codes, said compiling comprising the steps of:
      gathering uniform commodities code information and commodities description information corresponding to said uniform commodities code information from a plurality of clients;
      gathering tax assessment information for each of said commodities for a plurality of taxing jurisdictions;
      correlating said uniform commodities code information and said commodities description information with said tax assessment information; and
      storing said uniform commodities code information, said commodities description information and said tax assessment information in a master database hosted on a computer-readable medium;

(b) accessing said master database by a client, the client inquiring as to the tax assessment characteristics of at least one item of uniform commodities code information;

(c) comparing said at least one item of uniform commodities code information with said master database;

(d) modifying a client database hosted on a computer-readable medium to include updated tax assessment information from said master database for said at least one item of uniform commodities code information for at least one taxing jurisdiction of interest to the client; and (e) assessing, by the client, at such time that the client chooses to sell said at least one item of uniform commodities code information in at least one taxing jurisdiction of interest, appropriate sales tax for commodities sold by point of sale transactions in the at least one taxing jurisdiction in reliance upon said uniform commodities code information, said commodities description information and said tax assessment information stored in at least one of said master database and said client database.

14. The method of claim 13 wherein said uniform commodities code information is selected from the group consisting of the Universal Product Code (UPC) system, the Universal Service Code (USC) system, the International Standard Book Number (ISBN) system, the International Standard Serial Number (ISSN) system, the Global Service Relation Number (GSRN) system, and the European Article Numbering (EAN) system.

15. The method of claim 13 wherein said tax assessment information comprises an indication of whether a commodity is taxable, non-taxable or tax-exempt.

16. The method of claim 15 wherein, if a commodity is indicated as being taxable, said tax assessment information further includes a tax rate associated with the commodity.

17. The method of claim 13 wherein said step of accessing said master database is performed via a broadband network.

18. The method of claim 17 wherein said broadband network is the Internet.

19. The method of claim 13 wherein said taxing jurisdictions comprise local taxing jurisdictions.

20. The method of claim 13 wherein said taxing jurisdictions comprise state taxing jurisdictions.

21. The method of claim 13 wherein said taxing jurisdictions comprise federal taxing jurisdictions.

22. The method of claim 13 wherein said taxing jurisdictions comprise foreign taxing jurisdictions.

23. A method of assessing point of sale taxation, said method comprising the steps of:

(a) compiling a tax assessment database for commodities identified by uniform commodities codes, said compiling comprising the steps of:

obtaining uniform commodities code information and commodities description information corresponding to said uniform commodities code information, wherein said uniform commodities code information and said commodities description information are gathered from a plurality of clients;

obtaining tax assessment information for commodities for a plurality of taxing jurisdictions;

obtaining jurisdictional boundary information for said taxing jurisdictions; and correlating said uniform commodities code information, said commodities description information and said jurisdictional boundary information with said tax assessment information to determine the tax status for said commodities in said taxing jurisdictions; and storing said uniform commodities code information, said commodities description information, said jurisdictional boundary information and said tax assessment information in a master database hosted on a computer-readable medium;

(b) assessing appropriate sales tax for commodities sold by point of sale transactions in at least one of said taxing jurisdictions in reliance upon said uniform commodities code information, said commodities description information, said jurisdictional boundary information and said tax assessment information stored in said master database, and collecting sales tax at the point of sale.

24. The method of claim 23 wherein said uniform commodities code information is selected from the group consisting of the Universal Product Code (UPC) system, the Universal Service Code (USC) system, the International Standard Book Number (ISBN) system, the International Standard Serial Number (ISSN) system, the Global Service Relation Number (GSRN) system, and the European Article Numbering (EAN) system.

25. The method of claim 23 wherein said tax assessment information comprises an indication of whether a commodity is taxable, non-taxable or tax-exempt.

26. The method of claim 25 wherein, if a commodity is indicated as being taxable, said tax assessment information further includes a tax rate associated with the commodity.

27. The method of claim 23 wherein said taxing jurisdictions comprise local taxing jurisdictions.

28. The method of claim 23 wherein said taxing jurisdictions comprise state taxing jurisdictions.

29. The method of claim 23 wherein said taxing jurisdictions comprise federal taxing jurisdictions.

30. The method of claim 23 wherein said taxing jurisdictions comprise foreign taxing jurisdictions.

31. The method of claim 23 wherein said jurisdictional boundary information comprises postal code data for said taxing jurisdictions.

32. The method of claim 31 wherein said postal code data for said taxing jurisdictions comprises ZIP-related codes.

33. The method of claim 32 wherein said ZIP-related codes comprise five-digit ZIP codes.

34. The method of claim 32 wherein said ZIP-related codes comprise ZIP+4 codes.

35. The method of claim 32 wherein said ZIP-related codes comprise ZIP+6 codes.

36. The method of claim 23 wherein said jurisdictional boundary information comprises latitude and longitude coordinates for said taxing jurisdictions.

37. The method of claim 36 wherein said latitude and longitude coordinates comprise latitude and longitude data collected while traversing a path via a receiver in communication with satellites of the global positioning system.

38. The method of claim 36 further comprising comparing a physical address related to purchase of at least one commodity with said latitude and longitude data to determine in which of said taxing jurisdictions the commodity is subject to sales taxation.

39. The method of claim 38 wherein said physical address is selected from the group consisting of a billing address, delivery address, an address of a point of consumption of services, an address of a point of rendering of services, and an address of a service provider.

40. The method of claim 23 wherein said jurisdictional boundary information comprises census data associated with said taxing jurisdictions and processing said census data such that counties receive a unique Federal Information Processing Standard (FIPS) code and smaller jurisdictions receive a unique Minor Civil Division (MCD) code.

41. The method of claim 40 further comprising comparing a physical address related to purchase of at least one commodity with at least one of said FIPS codes and said MCD codes to determine in which of said taxing jurisdictions the commodity is subject to sales taxation.

42. The method of claim 40 wherein said physical address is selected from the group consisting of a billing address, delivery address, an address of a point of consumption of services, an address of a point of rendering of services, and an address of a service provider.

43. A method of assessing point of sale taxation, said method comprising the steps of:
(a) compiling a tax assessment database for commodities identified by uniform commodities codes, said compiling comprising the steps of:
obtaining postal code data associated with a plurality of taxing jurisdictions;
obtaining latitude and longitude coordinates data associated with said taxing jurisdictions; and
combining said postal code data and said latitude and longitude coordinates data to establish latitude and longitude coordinates data for jurisdictional boundaries of said taxing jurisdictions;
storing said latitude and longitude coordinates data for jurisdictional boundaries of said taxing jurisdictions in a master database hosted on a computer-readable medium;
(b) assessing appropriate sales tax for commodities sold by point of sale transactions in at least one of said taxing jurisdictions in reliance upon said latitude and longitude coordinates data for jurisdictional boundaries of said taxing jurisdictions stored in said master database.

44. The method of claim 43 wherein said postal code data for said taxing jurisdictions comprises ZIP-related codes.

45. The method of claim 44 wherein said ZIP-related codes comprise five-digit ZIP codes.

46. The method of claim 44 wherein said ZIP-related codes comprise ZIP+4 codes.

47. The method of claim 44 wherein said ZIP-related codes comprise ZIP+6 codes.

48. The method of claim 43 wherein said step of gathering latitude and longitude coordinates data comprises traversing a path and collecting latitude and longitude data via a receiver in communication with satellites of the global positioning system.

49. A method of assessing point of sale taxation, said method comprising the steps of:
(a) compiling a tax assessment database for commodities identified by uniform commodities codes, said compiling comprising the steps of:
obtaining postal code data associated with a plurality of taxing jurisdictions;
obtaining census data associated with said taxing jurisdictions and processing said census data such that counties receive a unique Federal Information Processing Standard (FIPS) code and smaller jurisdictions receive a unique Minor Civil Division (MCD) code;
combining said postal code data and said census data to establish FIPS and MCD code data for jurisdictional boundaries of said taxing jurisdictions; and
storing said FIPS and MCD code data for jurisdictional boundaries of said taxing jurisdictions in a master database hosted on a computer-readable medium;
(b) assessing appropriate sales tax for commodities sold by point of sale transactions in at least one of said taxing jurisdictions in reliance upon said FIPS and MCD code data for jurisdictional boundaries of said taxing jurisdictions stored in said master database.

50. The method of claim 49 wherein said postal code data for said taxing jurisdictions comprises ZIP-related codes.

51. The method of claim 50 wherein said ZIP-related codes comprise five-digit ZIP codes.

52. The method of claim 50 wherein said ZIP-related codes comprise ZIP+4 codes.

53. The method of claim 50 wherein said ZIP-related codes comprise ZIP+6 codes.

* * * * *